United States Patent
Ogura et al.

(10) Patent No.: US 8,665,425 B2
(45) Date of Patent: Mar. 4, 2014

(54) ECCENTRICITY MEASURING METHOD

(75) Inventors: Kazuyuki Ogura, Yao (JP); Masahiro Okitsu, Higashiosaka (JP); Youichi Ogawa, Tachikawa (JP); Kyu Takada, Otsu (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/640,709

(22) PCT Filed: Apr. 5, 2011

(86) PCT No.: PCT/JP2011/002018
§ 371 (c)(1),
(2), (4) Date: Oct. 11, 2012

(87) PCT Pub. No.: WO2011/129068
PCT Pub. Date: Oct. 20, 2011

(65) Prior Publication Data
US 2013/0027692 A1    Jan. 31, 2013

(30) Foreign Application Priority Data
Apr. 13, 2010 (JP) ................. 2010-092057

(51) Int. Cl.
*G01B 9/00* (2006.01)
*G01M 11/02* (2006.01)

(52) U.S. Cl.
CPC ............... *G01M 11/0221* (2013.01)
USPC ........................................ 356/127; 356/124

(58) Field of Classification Search
CPC ................................ G01M 11/0221
USPC ...................................... 356/124–127
See application file for complete search history.

(56) References Cited

U.S. PATENT DOCUMENTS

| 5,742,381 | A | 4/1998 | Ueno | |
| 7,540,982 | B2 * | 6/2009 | Shyu et al. | 264/1.32 |
| 2005/0128468 | A1 * | 6/2005 | Murata | 356/127 |
| 2008/0093759 | A1 * | 4/2008 | Shyu et al. | 264/40.1 |
| 2010/0149549 | A1 * | 6/2010 | Negishi | 356/521 |
| 2010/0231923 | A1 * | 9/2010 | Ge et al. | 356/511 |

FOREIGN PATENT DOCUMENTS

| JP | 57-113342 | 7/1982 |
| JP | 4-106447 | 4/1992 |
| JP | 9-138181 | 5/1997 |
| JP | 3127003 | 11/2001 |

(Continued)

OTHER PUBLICATIONS

International Search Report from the Japanese Patent Office, mailed Jul. 19, 2011, for International Application No. PCT/JP2011/002018.

(Continued)

*Primary Examiner* — Michael P Stafira
(74) *Attorney, Agent, or Firm* — Finnegan, Henderson, Farabow, Garrett & Dunner, L.L.P.

(57) ABSTRACT

In an eccentricity measuring method according to the present invention, a first position of a light source image formed by reflection at one optical surface is measured (S2), a predetermined second position related to another optical surface is measured (S3), and a relative eccentricity between both optical surfaces is calculated based on the first and second positions (S5). Therefore, the eccentricity measuring method enables measurement of eccentricity by a same measurement optical system regardless of a radius of curvature of an optical surface of an optical element.

12 Claims, 18 Drawing Sheets

(56) References Cited

FOREIGN PATENT DOCUMENTS

| JP | 2002-71344 | 3/2002 |
| JP | 2005-90962 | 4/2005 |
| JP | 2007-47131 | 2/2007 |
| JP | 2009-97952 | 5/2009 |
| JP | 2010-19832 | 1/2010 |
| WO | WO 2007-018118 | 2/2007 |

OTHER PUBLICATIONS

Japanese Office Action in corresponding Japanese Application No. 2012-510550 mailed May 21, 2013.

* cited by examiner

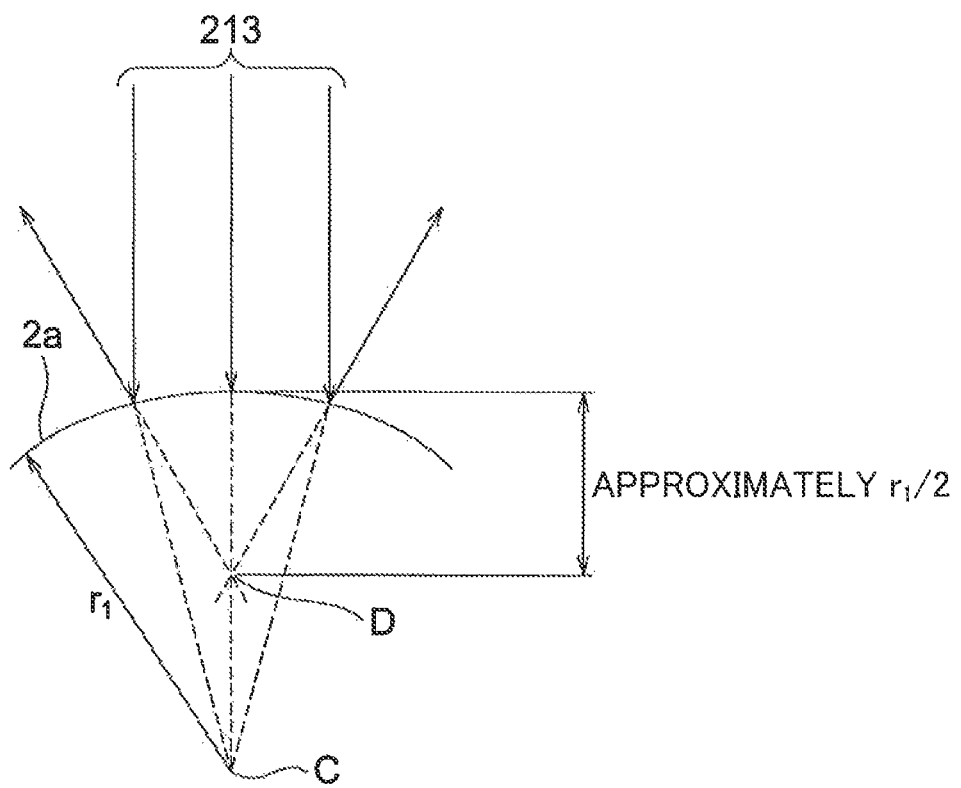

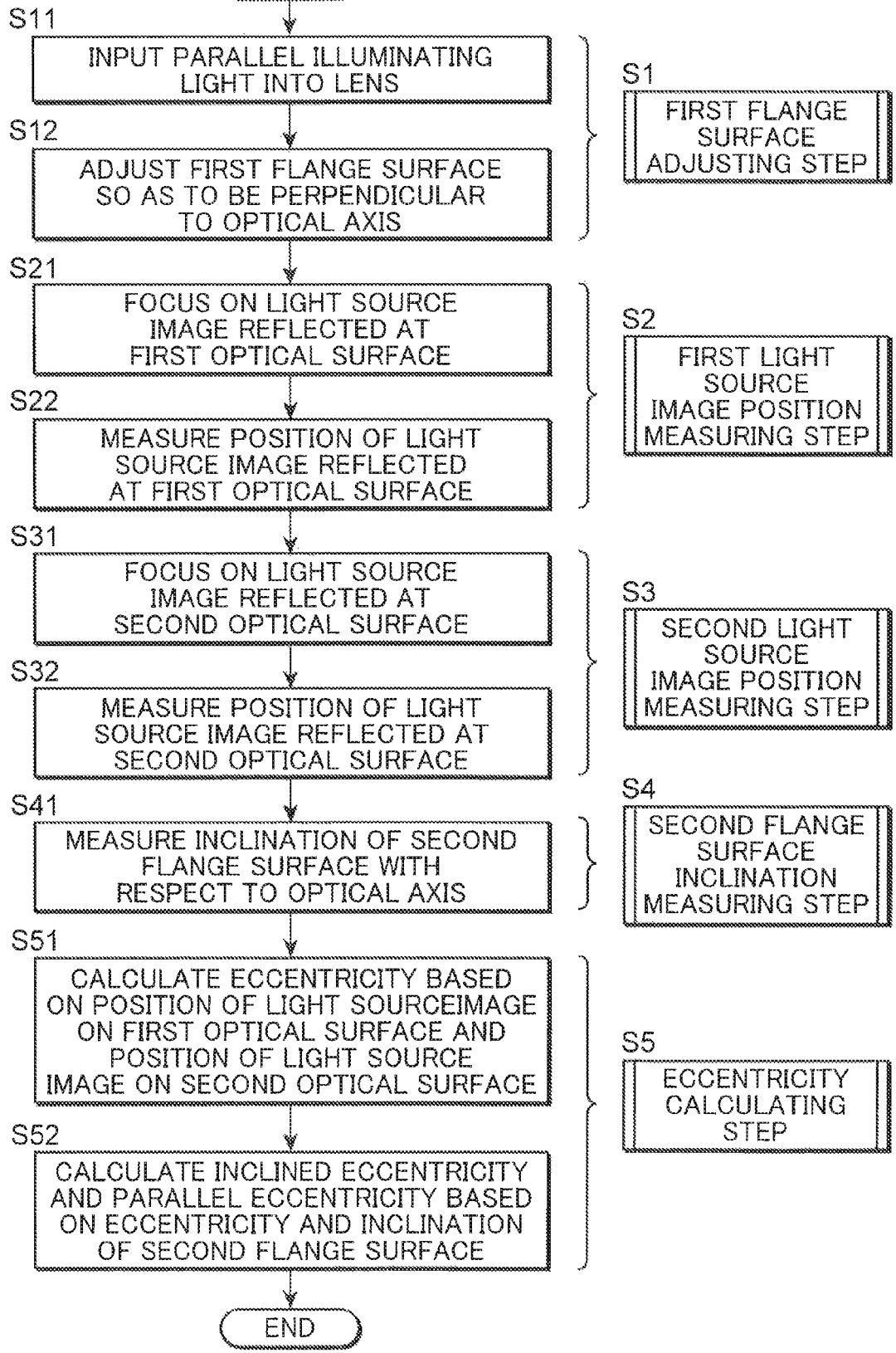

ECCENTRICITY MEASURING METHOD

TECHNICAL FIELD

The present invention relates to an eccentricity measuring method for measuring eccentricity and, in particular, to an eccentricity measuring method for measuring eccentricity of an optical element molded by a mold process.

BACKGROUND ART

Recently, in lens fabrication, mold processes in which a lens is fabricated by transfer of a mold shape are employed more often than polishing. Examples of mold processes include a molding method by hot pressing using glass or a thermoplastic resin as a lens material, a compression molding method or a cast molding method using a thermosetting resin or an ultraviolet curable resin as a lens material, and the like. Mold processes are advantageous in that lenses can be mass-produced at low cost by creating a single mold and aspherical surfaces and free-form surfaces which are difficult to fabricate by polishing can be produced.

As shown in FIG. 16, molds 2 and 3 for molding a lens 1 have lens mold surfaces 2a and 3a which form a lens surface shape such as a spherical surface or an aspherical surface and flat surfaces; 2b and 3b which are formed at the same time as the lens mold surfaces 2a and 3a and which extend from circumferential edges of the lens mold surfaces 2a and 3a. Even when the flat surfaces 2b and 3b are not machined at the same time as the lens mold surfaces 2a and 3a, there are cases where the flat surfaces 2b and 3b are used as machining reference planes for machining the lens mold surfaces 2a and 3a. The lens 1 molded by such molds 2 and 3 has lens surfaces 1a and 1b molded by the lens mold surfaces 2a and 3a of the respective molds 2 and 3 and flange surfaces 1c and 1d which are ring-like flat portions molded by the flat surfaces 2b and 3b and which extend from circumferential edges of the lens surfaces 1a and 1b, As described above, since the flat surfaces 2b and 3b of the molds 2 and 3 function as machining reference planes, inclinations of the lens surfaces 1a and 1b of the molded lens 1 and inclinations of the flat surfaces 2b and 3b of the molds 2 and 3 are equal to each other.

When a lens is molded by a mold process in this manner, if misalignments occur between positions and postures of the two molds mounted on a molding machine, a parallel eccentricity 4 or an inclined eccentricity 5 is created between the molds 2 and 3 as shown in FIG. 17. With the lens 1 shown in FIG. 18 molded using the molds 2 and 3 with such eccentricity, at least one of a parallel eccentricity 6 and an inclined eccentricity 7 of the lens surface 1a occurs with respect to either an external shape of the lens 1 or the lens surface 1b. Depending on the lens, even a parallel eccentricity 6 of around several μm or an inclined eccentricity 7 of around several arc-minutes may prevent desired lens characteristics from being achieved. Therefore, in order to achieve desired lens characteristics, the positions and postures of the mold in the molding machine must be readjusted. To do so, amounts and directions of the parallel eccentricity 6 and the inclined eccentricity 7 of the molded lens must be measured and fed back to the positions and postures of the mold.

From this perspective, for example, methods of measuring amounts and directions of a parallel eccentricity and an inclined eccentricity of a lens and the like have been conventionally proposed. For an inspection of an optical element such as a lens, a mirror, and a prism, a measuring instrument (autocollimator) based on a principle of an autocollimation method which enables precise measurement of an angle of an inspected surface is used.

For example, Patent Document 1 discloses, with respect to an aspherical lens comprising two optical surfaces that form the aspherical lens and two flat portions which are respectively coaxial with the optical surfaces and which are respectively integrally formed with the optical surfaces, a method of detecting an angle of inclination formed between the two flat portions and an angle of eccentricity of the two optical surfaces with respect to a measurement axis in order to compute an eccentricity of the aspherical lens based on detected values thereof.

In addition, Patent Document 2 discloses a method of measuring eccentricity using an autocollimation method even in a case of meniscus lens in which a first surface and a second surface share a same center of curvature.

However, the autocollimation methods used in Patent Document 1 and Patent Document 2 require that a relay lens be appropriately selected according to a radius of curvature of a lens surface of the lens being tested and a spherical wave corresponding to the lens surface be created. Therefore, with autocollimation methods, a dedicated measurement optical system must be prepared for each lens being tested, resulting in inflated facility cost. In addition, a set-up change of measurement optical systems must be performed every time the lens being tested changes, resulting in prolonged measurement preparation periods.

Patent Document 1: Japanese Patent Publication No. 3127003

Patent Document 2: Japanese Patent Application Publication No. H04-106447

SUMMARY OF THE INVENTION

The present invention has been made in consideration of the circumstances described above, and an object thereof is to provide an eccentricity measuring method that enables measurement of eccentricity by a same measurement optical system regardless of a radius of curvature of an optical surface of an optical element.

With the eccentricity measuring method according to the present invention, a first position of a light source image formed by reflection at one optical surface is measured, a predetermined second position related to another optical surface is measured, and a relative eccentricity between both optical surfaces is calculated based on the first and second positions. Therefore, the eccentricity measuring method according to the present invention enables measurement of eccentricity by a same measurement optical system regardless of a radius of curvature of an optical surface of an optical element.

The above and other objects, features, and advantages of the present invention will become more apparent from the detailed description below taken in connection with the accompanying drawings.

BRIEF DESCRIPTION OF THE DRAWINGS

FIG. 3 is a schematic view showing a principle of eccentricity measurement.

FIG. 4 is a process chart showing a first embodiment of an eccentricity measurement method.

DESCRIPTION OF EMBODIMENTS

Figure 1:
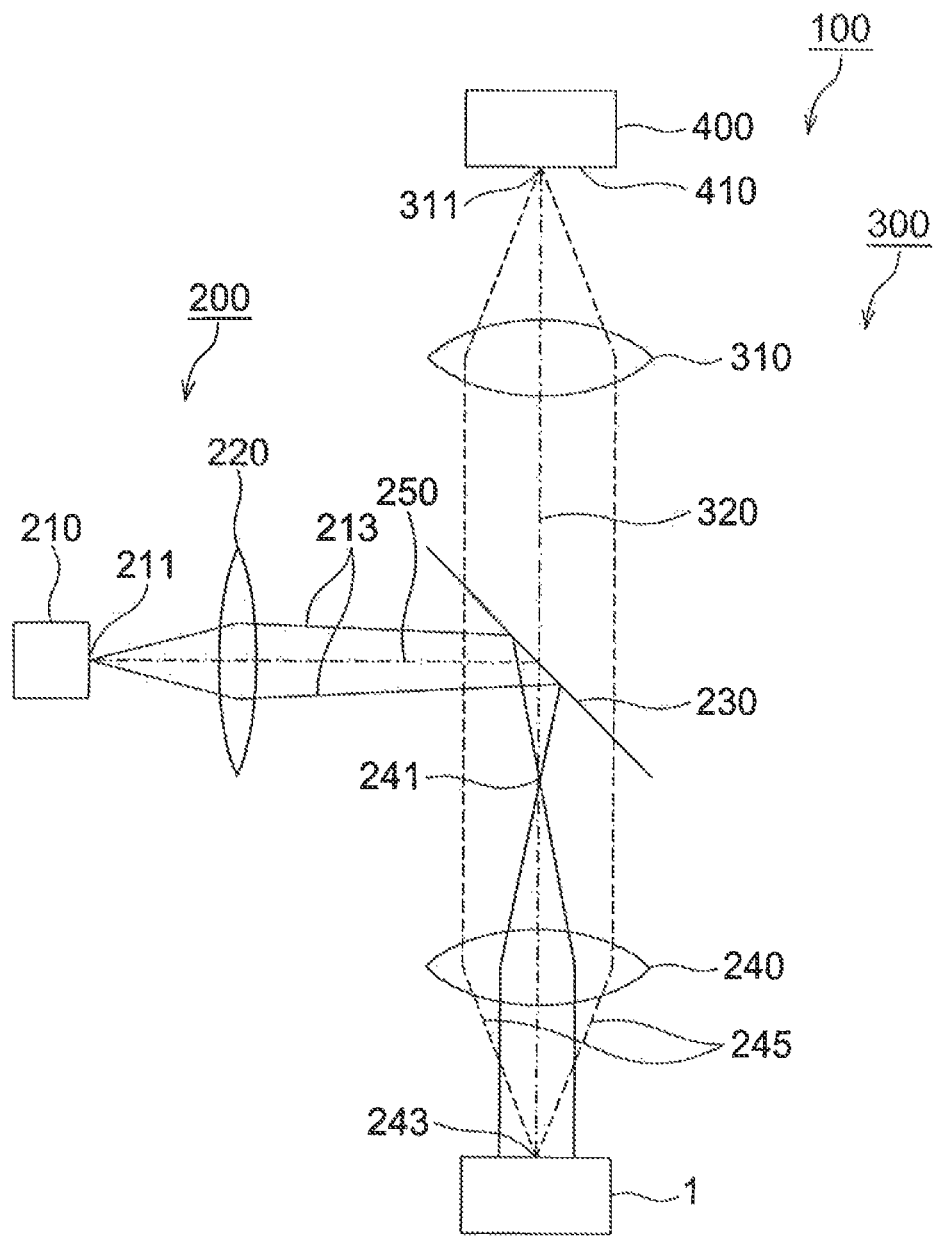
FIG. 1 is a sectional schematic view showing an example of an eccentricity measuring device used for eccentricity measurement.

Although the present invention will be described below based on illustrated embodiments, it is to be understood that the present invention is not limited to these embodiments. Moreover, in the drawings, same or similar portions are denoted by same reference numerals and overlapping descriptions thereof may be omitted.

First, an example of an eccentricity measuring device used for eccentricity measurement in an embodiment of the present invention will be described with reference to FIG. 1. FIG. 1 is a sectional schematic view showing an example of an eccentricity measuring device used for eccentricity measurement, In FIG. 1, an eccentricity measuring device 100 is configured so as to comprise an illumination optical system 200, a measurement optical system 300, a measurement sensor 400, and the like. The illumination optical system 200 irradiates an optical element 1 with an illuminating light 213 and is configured so as to comprise, for example, a light source 210, a condensing lens 220, a mirror 230, an objective lens 240, and the like. The illuminating light 213 from a light-emitting unit 211 of the light source 210 is condensed by the condensing lens 220, reflected at the mirror 230, and is first focused on a pupil 241 of the objective lens 240. The illuminating light 213 focused on the pupil 241 of the objective lens 240 is converted into a parallel light by the objective lens 240 and is incident on the optical element 1, and uniformly illuminates the optical element 1.

The measurement optical system 300 guides the illuminating light 213 reflected at the optical element 1 to the measurement sensor 400 and is configured so as to comprise, for example, the objective lens 240, an eyepiece lens 310, and the like. At the measurement optical system 300, a reflected light 245 reflected at the optical element 1 is condensed by the objective lens 240 and an image of the optical element 1 is formed by the eyepiece lens 310 on an imaging plane 410 of the measurement sensor 400 that is arranged at a focal point of the eyepiece lens 310.

An optical axis 250 of the illumination optical system 200 and an optical axis 320 of the measurement optical system 300 are aligned with each other. As a result, the light-emitting unit 211 of the light source 210, the pupil 241 of the objective lens 240, a focal point 243 of the objective lens 240, and a focal point 311 of the eyepiece lens 310 are positioned conjugate to each other.

The illumination optical system 200 described above is referred to as a Kohler illumination and is one form of an optical system for uniformly illuminating a surface which is used as a coaxial episcopic illuminating device of a microscope and the like. In addition, the measurement optical system 300 described above is a general microscope observation optical system. In other words, as the optical system of the eccentricity measuring device 100, a general microscope comprising a coaxial episcopic illuminating device with a Kohler illumination can be used. Accordingly, since a special device need not he used as the eccentricity measuring device 100, the cost with respect to the measuring device can be reduced.

Moreover, while a Kohler illumination has been used as the illumination optical system 200 in the example described above, the illumination optical system 200 is not limited to a Kohler illumination and may be any optical system as long as a light source image is formed at a back focal point position of the objective lens 240.

The measurement sensor 400 is a two-dimensional image sensor such as a CCD imaging element or a CMOS imaging element and captures an image formed on the imaging plane 410 by the eyepiece lens 310. An imaging output of the measurement sensor 400 may be outputted to a monitor (not shown) to be used in eccentricity measurement based on visual confirmation or inputted to a personal computer to be used in eccentricity measurement based on image processing. A general microscope camera can be used for the measurement sensor 400. Similarly, since a special device need not be used, the cost with respect to the measuring device can be reduced.

Figure 2A:
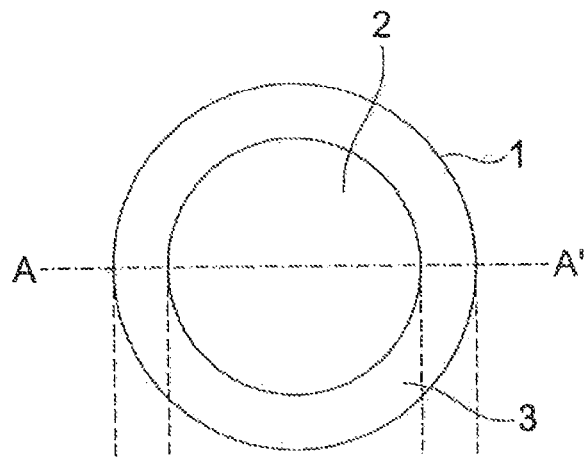
FIG. 2 is a schematic view showing a shape of a lens as a first example of an optical element.
Figure 2B:
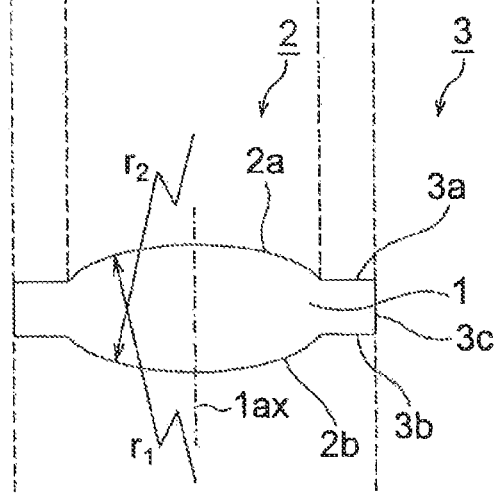
Figure 2C:
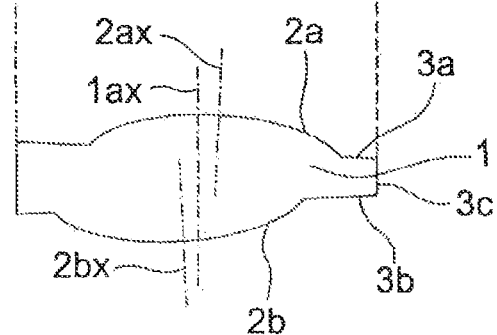

Next, a first example of an optical element will be described with reference to FIG. 2. FIG. 2 is a schematic view showing a shape of a lens as a first example of an optical element, wherein FIG. 2A shows an external shape of the lens, FIG. 2B shows a section taken along A-A in FIG. 2A in a case where the lens has no eccentricity, and FIG. 2C shows a section taken along A-A' in FIG. 2A in a case where the lens has eccentricity. While the shown lens shapes are similar to those shown in FIGS. 16 and 18, assigned reference numerals partially differ from each other.

In FIG. 2A, a lens 1 is shaped such that a ring-like flange portion 3 encompasses an optical surface 2.

In FIG. 2B, the optical surface 2 of the lens 1 comprises a first optical surface 2a having a radius of curvature of $r_1$ and a second optical surface 2b which has a radius of curvature of $r_2$ and which opposes the first optical surface 2a. The lens 1 is a biconvex lens. The flange portion 3 comprises a first flange surface 3a which connects to the first optical surface 2a and which is a flat surface perpendicular to an optical axis, a second flange surface 3b which connects to the second optical surface 2b and which is a fiat surface perpendicular to the optical axis, and a lens end surface (circumferential surface) 3c which is parallel to the optical axis. The first optical surface 2a and the second optical surface 2b have no eccentricity and optical axes of both surfaces are aligned with a design optical axis 1ax of the lens 1.

Figure 18:
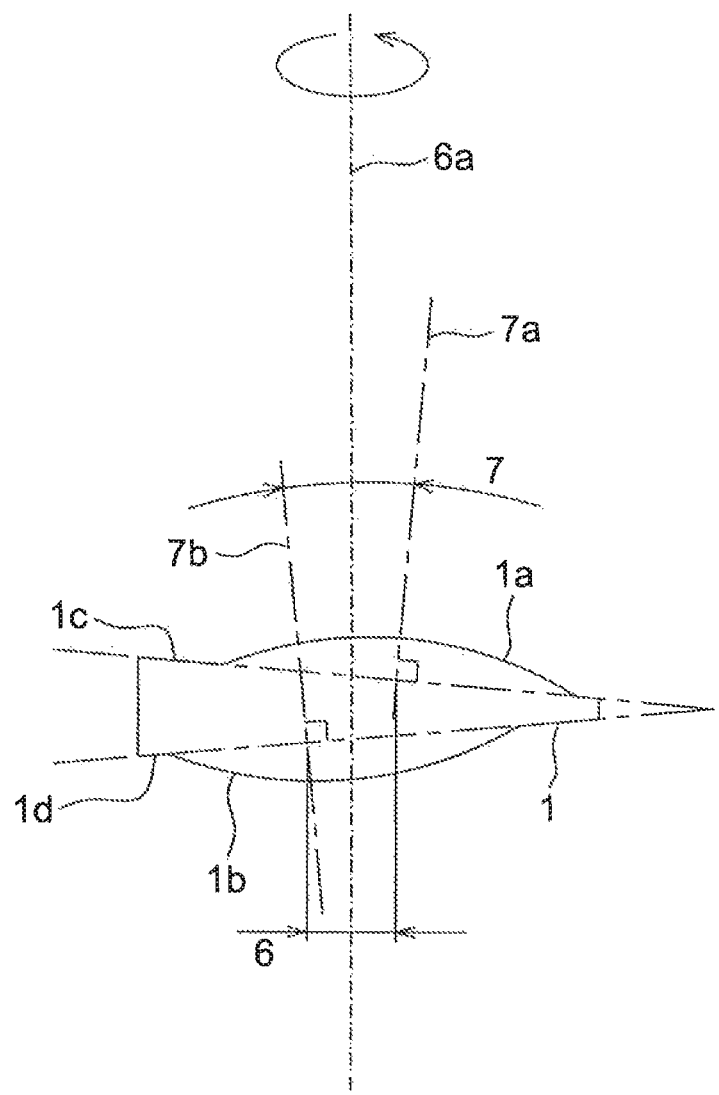
FIG. 18 is a schematic view showing a parallel eccentricity and an inclined eccentricity of a lens molded using a mold process.

FIG. 2C shows an example of a case of a biconvex lens with a same shape as that shown in FIG. 18 in which both the first optical surface 2a and the second optical surface 2b have a parallel eccentricity and an inclined eccentricity. An optical axis 2ax of the first optical surface 2a and an optical axis 2bx of the second optical surface 2b are both misaligned from the design optical axis 1ax of the lens 1. A parallel eccentricity refers to a state in which an optical axis of an optical surface is displaced from a design optical axis of a lens in a perpendicular direction thereto, and an amount of parallel eccentricity is a distance of the displacement as expressed in length units (for example, μm). An inclined eccentricity refers to a state in which an optical axis of an optical surface is inclined with respect to a design optical axis of a lens, and an amount of inclined eccentricity is an angle of the displacement as expressed in angular units (for example, arc-minutes).

Next, a principle of eccentricity measurement according to an embodiment of the present invention will be described with reference to FIG. 3. FIG. 3 is a schematic view showing a principle of eccentricity measurement.

In FIG. 3, a parallel illuminating light 213 incident on the convex optical surface 2a with a radius of curvature of $r_1$ is formed as a virtual image at a position D approximately $r_1/2$ from an apex portion of the optical surface 2a toward a center of curvature C, and a light source image of the illuminating light 213 is formed at the position D. In a case where the optical surface 2a is a concave surface, a light source image of the illuminating light 213 is formed as a real image at a position D approximately $r_1/2$ from the optical surface 2a on an opposite side to the center of curvature C. Therefore, by moving the focal point 243 of the objective lens 240 of the measurement optical system 300 shown in FIG. 1 to the position D, a light source image of the illuminating light 213 can be formed on the imaging plane 410 of the measurement sensor 400.

When the optical surface 2a has a parallel eccentricity, the position D of the light source image moves according to the amount of eccentricity within a plane perpendicular to the optical axis. Therefore, by measuring the position D of the light source image within a plane perpendicular to the optical axis, an amount of parallel eccentricity can be obtained.

The light source 210 used for eccentricity measurement will now be described. In order to measure the position D of a light source image according to the principle shown in FIG. 3, the smaller the size of the light source, the better. For example, when using a small light source such as a laser diode, since a small image of the laser diode is formed at the position D, the position D can be measured with ease. In addition, since an emission wavelength of a laser diode is a single wavelength and therefore does not require achromatization, an optical system capable of forming a light source image without aberration can be readily created.

On the other hand, for example, when using a light bulb that is generally used as an illumination device for a microscope, a large image of a filament formed at the position D makes it difficult to detect a central position of a light source image. Therefore, such a light bulb is inadequate for measuring the position D of a light source image.

In consideration thereof, there is a method of forming a plurality of secondary light sources using a light bulb and an integrator so that the plurality of secondary light sources appear as a uniform surface light source. A fly's eye lens system, a rod lens system, or the like can be used as an integrator optical system. By using an integrator, an outline of the light source becomes sharper and a central position can be detected more easily. Alternatively, a laser diode and a general microscope illumination device such as a light bulb can be used in combination.

Figure 6A:
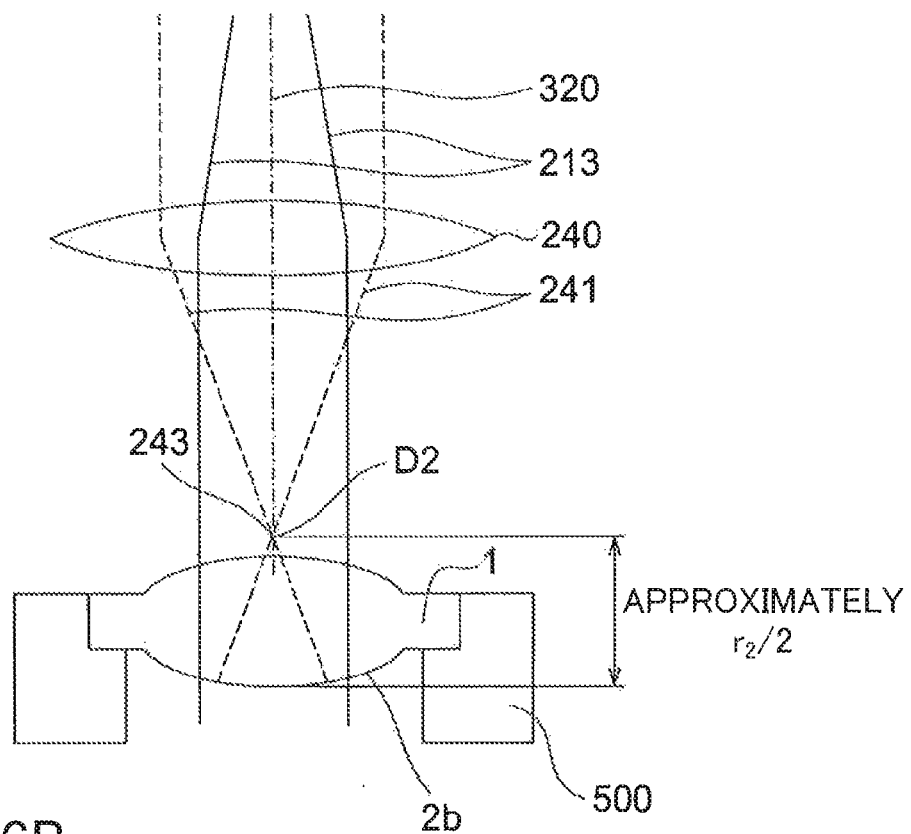
FIG. 6 is a schematic view (2/2) showing the respective steps described in FIG. 4.
Figure 6B:
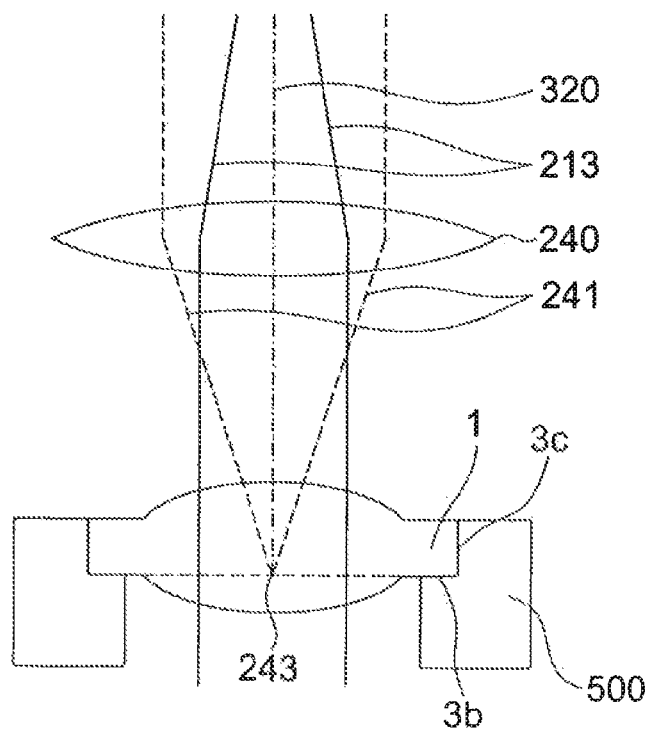
Figure 7:
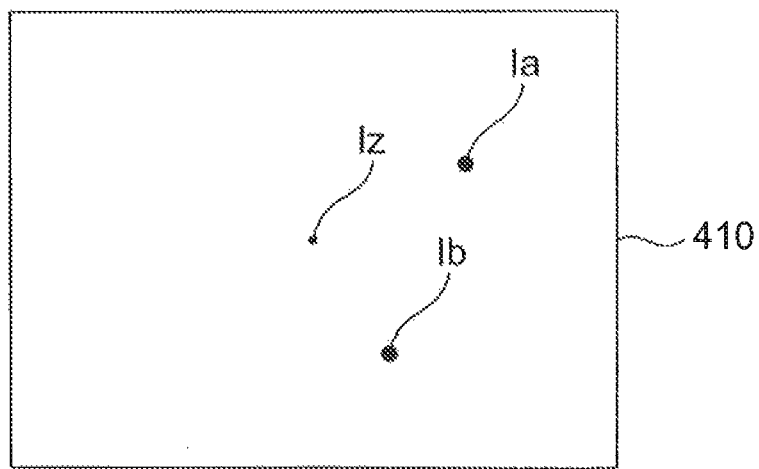
FIG. 7 is a schematic view showing an image on a measurement sensor during eccentricity measurement.

Next, a first embodiment of an eccentricity measuring method according to an embodiment of the present invention will be described with reference to FIGS. 4 to 7. FIG. 4 is a process chart showing the first embodiment of an eccentricity measurement method. FIGS. 5 and 6 are schematic views showing the respective steps described in FIG. 4. FIG. 7 is a schematic view showing an image on a measurement sensor during eccentricity measurement.

In FIG. 4, the first embodiment of an eccentricity measurement method comprises the five steps below.

(S1) First Flange Surface Adjusting Step

Figure 5A:
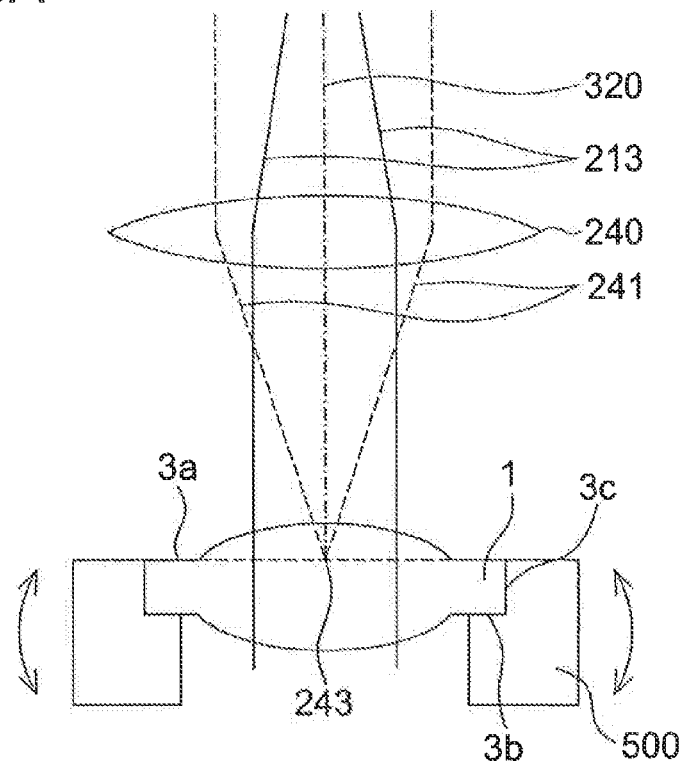
FIG. 5 is a schematic view (1/2) showing the respective steps described in FIG. 4.

This first flange surface adjusting step is a step in which the first flange surface 3a is adjusted so as to be perpendicular to the optical axis 320 of the eccentricity measuring device 100 in order to correct eccentricity caused by a posture error attributable to an inclination of the lens 1. As shown in FIG. 5A, the lens 1 is held by a holding section 500 so that, for example, with reference to the second flange surface 3b and the lens end surface 3c of the flange portion 3, the lens 1 is rotatable around the optical axis 320 and, at the same time, the lens 1 is movable parallel to the optical axis 320.

In step S11 in FIG. 4, the parallel illuminating light 213 is inputted to the lens 1. In step S12, a lens which is referred to as an interference objective lens and which enables an inclination of a surface to be ascertained based on interference fringes is used as the objective lens 240, and the focal point 243 of the objective lens 240 is adjusted to the first flange surface 3a of the lens 1.

In this state, using an image captured by the measurement sensor 400, the holding section 500 is rotationally moved around the optical axis 320 so that the interference fringes of the first flange surface 3a become symmetrical around the optical axis 320. Accordingly, the first flange surface 3a is adjusted so as to be perpendicular to the optical axis 320 of the eccentricity measuring device 100. Since the first flange surface 3a is molded by a mold at the same time as the first optical surface 2a, due to this adjustment, the inclined eccentricity of the first optical surface 2a with respect to the optical axis 320 is corrected. This state is shown in FIG. 5A.

(S2) First Light Source Image Position Measuring Step

Figure 5B:
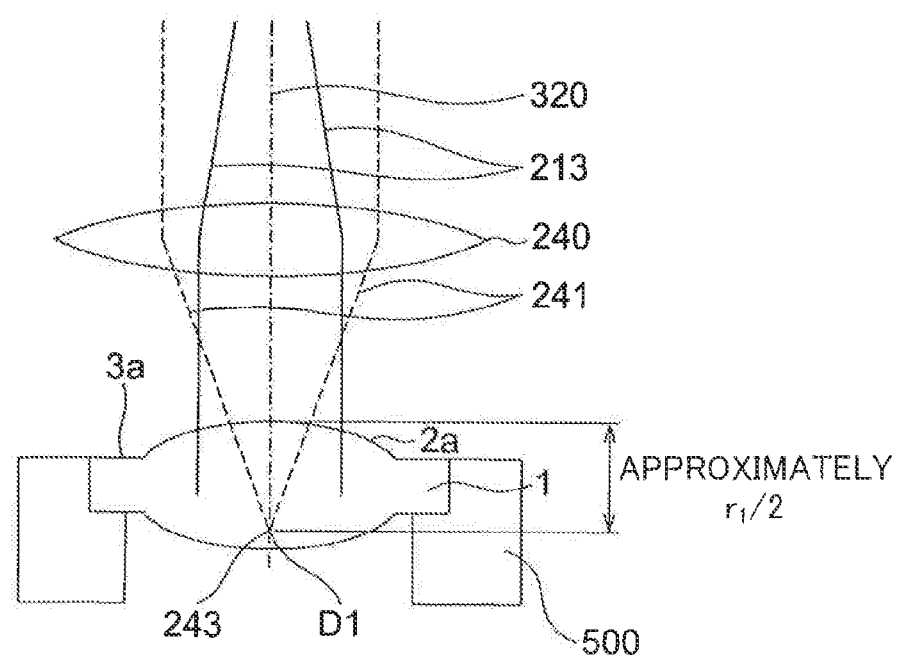

This first light source image position measuring step is a step in which a position of an image of the light source 210 reflected at the first optical surface 2a is measured. In step S21 in FIG. 4, as shown in FIG. 5B, a part of the parallel illuminating light 213 is reflected at the convex first optical surface 2a with a radius of curvature of $r_1$ and is formed as an image of the light source 210 at a position D1 approximately $r_1/2$ from an apex portion of the first optical surface 2a toward a center of curvature. Therefore, by changing an interval between the objective lens 240 and the lens 1, the focal point 243 of the objective lens 240 is brought into focus at the position D1. Accordingly, via the measurement optical system 300, an image of the light-emitting unit 211 of the light source 210 reflected at the first optical surface 2a is formed on the imaging plane 410 of the measurement sensor 400.

In step S22 in FIG. 4, as shown in FIG. 7, a first position Ia of the image of the light source 210 which is reflected at the first optical surface 2a and formed on the imaging plane 410 of the measurement sensor 400 is measured and stored. Moreover, a point Iz shown in FIG. 7 represents a position of the optical axis 320.

(S3) Second Light Source Image Position Measuring Step

This second light source image position measuring step is a step in which a position of an image of the light source 210 reflected at the second optical surface 2b is measured. In step S31 in FIG. 4, as shown in FIG. 6A, a part of the parallel illuminating light 213 is reflected at the convex second optical surface 2b with a radius of curvature of $r_2$ and is formed as an image of the light source 210 at a position D2 approximately $r_2/2$ from an apex portion of the second optical surface 2b toward a center of curvature. Therefore, by changing an interval between the objective lens 240 and the lens 1, the focal point 243 of the objective lens 240 is brought into focus at the position D1. Accordingly, via the measurement optical system 300, an image of the light-emitting unit 211 of the light source 210 reflected at the second optical surface 2b is formed on the imaging plane 410 of the measurement sensor 400.

In step S32 in FIG. 4, as shown in FIG. 7, a second position Ib of the image of the light source 210 which is reflected at the second optical surface 2b and formed on the imaging plane 410 of the measurement sensor 400 is measured and stored.

(S4) Second Flange Surface Inclination Measuring Step

This second flange surface inclination measuring step is a step in which an inclination of the second flange surface 3b is measured. In step S41 in FIG. 4 an interference objective lens is used as the objective lens 240 and the focal point 243 of the objective lens 240 is adjusted to the second flange surface 3b off the lens 1.

In this state, an inclination of the second flange surface 3b is measured and stored based on interference fringes of the second flange surface 3b of an image captured by the measurement sensor 400. This state is shown in FIG. 6B. The second flange surface 3b is molded with a mold at the same time as the second optical surface 2b. In addition, the inclined eccentricity of the first optical surface 2a with respect to the optical axis 320 has been corrected in (S1) first flange surface adjusting step described above. Therefore, the inclination of the second flange surface 3b represents a relative inclined eccentricity between the first optical surface 2a and the second optical surface 2b.

(S5) Eccentricity Calculating Step

This eccentricity calculating step is a step in which a relative eccentricity between the first optical surface 2a and the second optical surface 2b is calculated. In step S51 in FIG. 4, based on the first position Ia of the image of the light source 210 reflected at the first optical surface 2a and measured in (S2) first light source image position measuring step described above and on the second position Ib of the image of the light source 210 reflected at the second optical surface 2b and measured in (S3) second light source image position measuring step described above, a relative eccentricity between the first optical surface 2a and the second optical surface 2b is calculated. More specifically, the relative eccentricity is calculated based on a distance between the position Ia and the position Ib on the measurement sensor.

In step S52 in FIG. 4, using an inclination of the second flange surface 3b measured in (S4) second flange surface inclination measuring step or, in other words, using a relative inclined eccentricity between the first optical surface 2a and the second optical surface 2b, an inclined eccentricity of the second optical surface 2b is separated from the relative eccentricity between the first optical surface 2a and the second optical surface 2b and a relative parallel eccentricity between first optical surface 2a and the second optical surface 2b is calculated. More specifically, since the position Ib on the measurement sensor is a composite position of an inclined eccentricity and a parallel eccentricity, if an angle of inclination of the second flange surface 3b is denoted by α and a radius of curvature of the optical surface is denoted by r, an inclined eccentricity is converted into a parallel eccentricity by rsin α and separated into a component of an inclined eccentricity that has been converted into the parallel eccentricity and a component of an original parallel eccentricity.

Moreover, when the inclination of the lens 1 is small or when there is no need to separate inclined eccentricity from parallel eccentricity, (S1) first flange surface adjusting step and (S4) second flange surface inclination measuring step are not essential.

As described above, according to the first embodiment, the eccentricity measuring method comprises: a first flange surface adjusting step of adjusting a first flange surface of an optical element so as to be perpendicular to an optical axis of an eccentricity measuring device; a first light source image position measuring step of causing an illuminating light from a light source to be incident on a first optical surface and measuring a first position of an image of the illuminating light source formed by reflection of the illuminating light at the first optical surface; a second light source image position measuring step of causing the illuminating light to be incident on a second optical surface and measuring a second position of an image of the illuminating light source formed by reflection of the illuminating light at the second optical surface; a second flange surface inclination measuring step of measuring an inclination of a second flange surface; and an eccentricity calculating step of calculating a relative eccentricity between the first optical surface and the second optical surface based on the first position, the second position, and the inclination of the second flange surface. As a result, the present eccentricity measuring method is capable of measuring eccentricity with a same measurement optical system regardless of a radius of curvature of an optical surface of an optical element.

Next, a second example of an optical element will be described with reference to FIG. 8. FIG. 8 is a schematic view showing a shape of a lens as a second example of an optical element, wherein FIG. 8A shows an external shape of the lens, and FIG. 8B shows a section of the lens taken along A-A' in FIG. 8A.

Figure 8A:
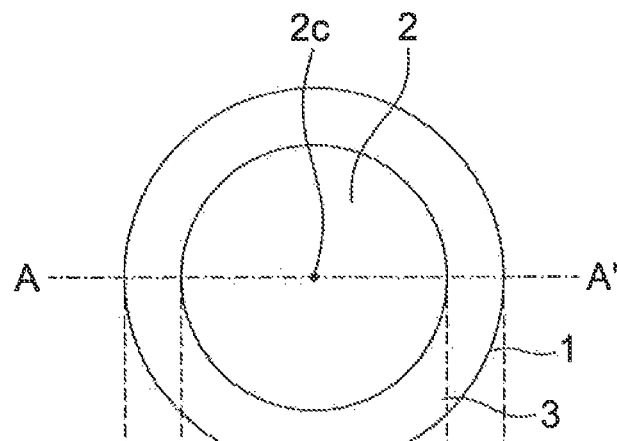
FIG. 8 is a schematic view showing a shape of a lens as a second example of an optical element.

In FIG. 8A, a lens 1 is shaped such that a ring-like flange portion 3 encompasses an optical surface 2. A center mark 2c is provided at a center of one face of the optical surface 2. A center mark is a mark provided at a center of an optical surface of a lens. For example, a center mark is a convex or concave mark small enough not to affect optical performance of a lens. As a method of providing a center mark, for example, a method involving providing a protrusion or a depression at a center of a mold and transferring the protrusion or the depression to a lens is favorable since the mark can be readily and reliably formed.

Figure 16:
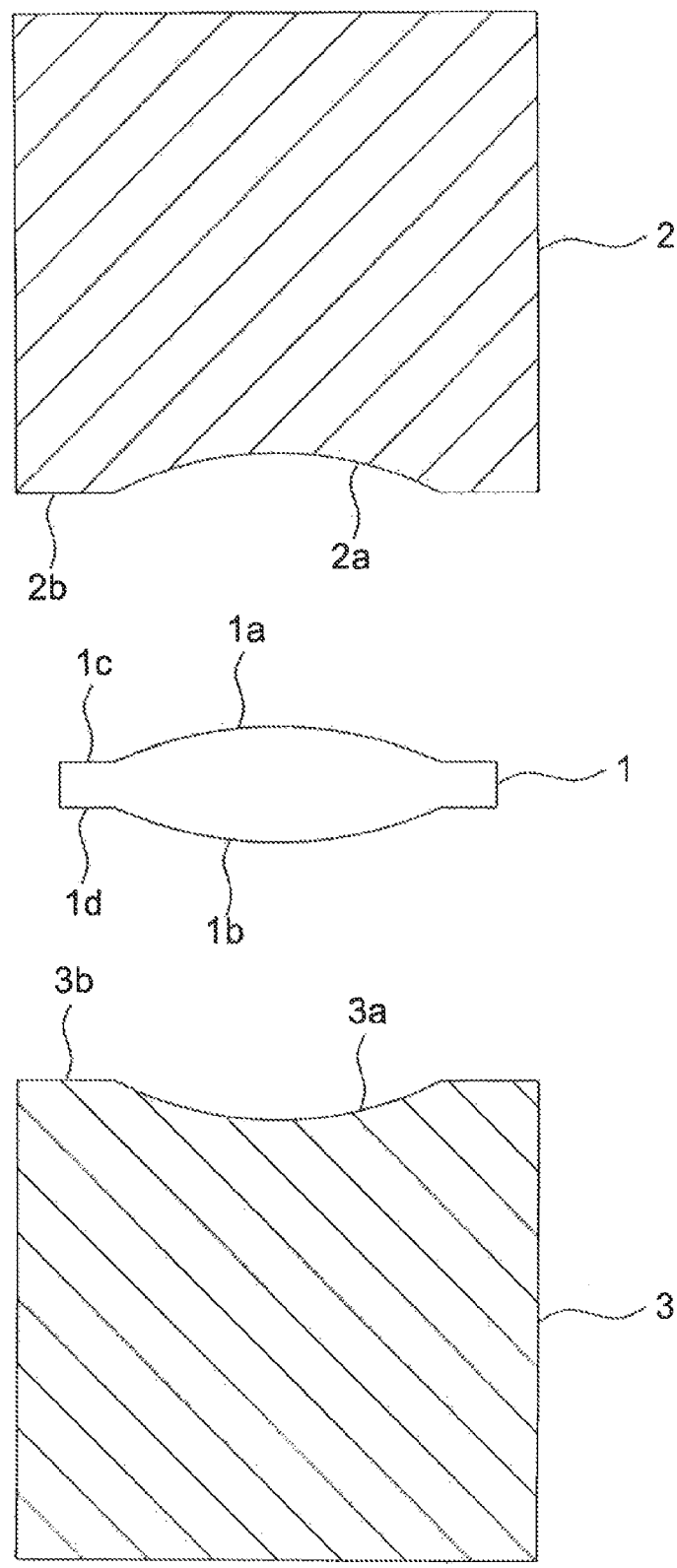
FIG. 16 is a schematic view showing a lens molding method using a mold process.
Figure 17:
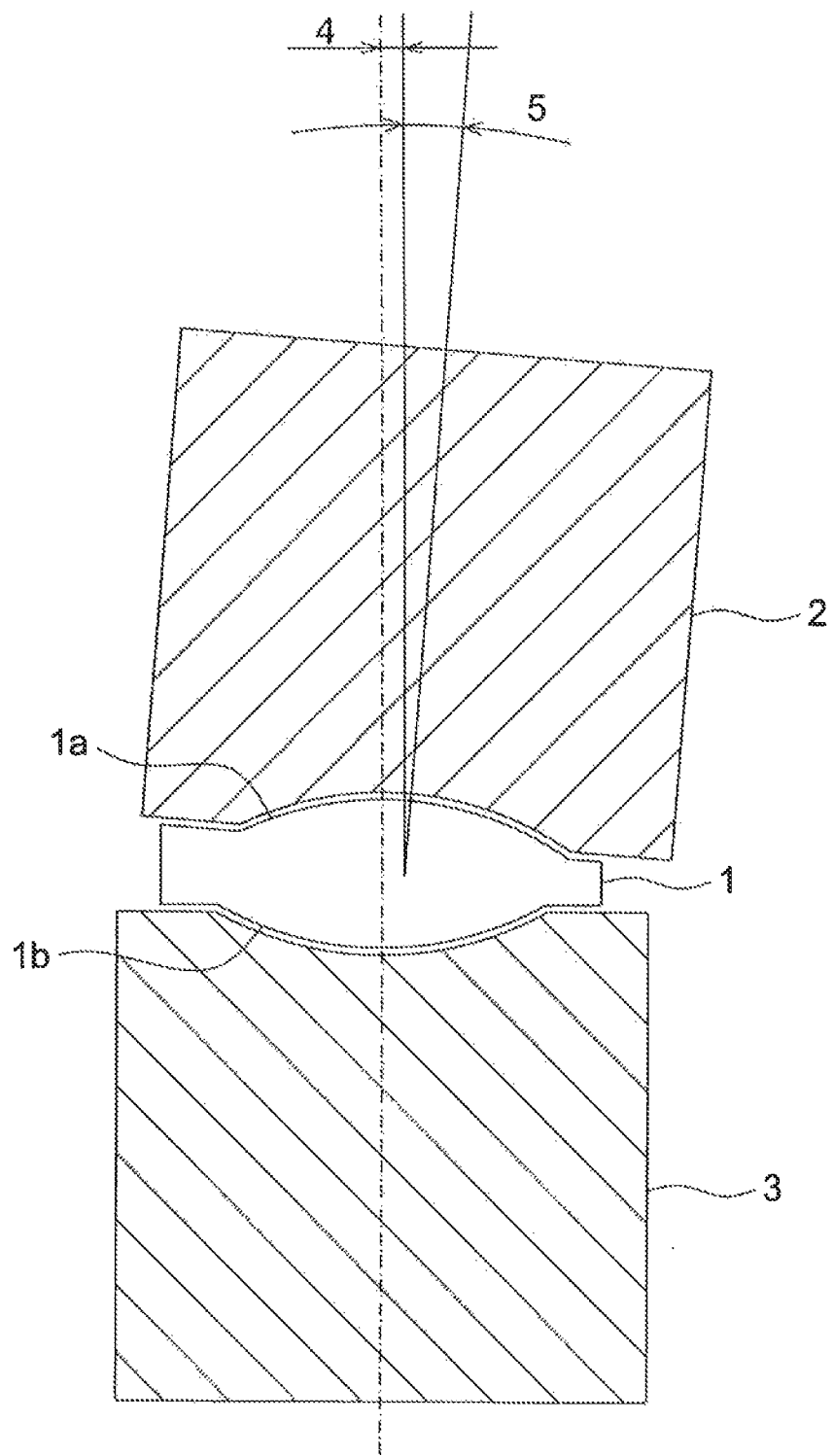
FIG. 17 is a schematic view showing a parallel eccentricity and an inclined eccentricity during, lens molding using a mold process.

With a molding method such as that shown in FIG. 16, since a surface shape of a lower mold has better transferability, a center mark is often provided on the lower mold. However, molding methods are not limited thereto and a center mark may alternatively be provided on an upper mold or provided on both upper and lower molds. In the example shown in FIG. 8, it is assumed that the center mark 2c is provided on a first optical surface 2a.

Figure 8B:
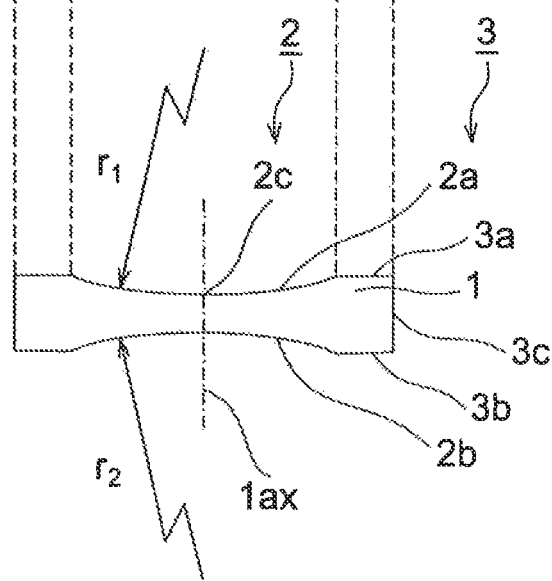

In FIG. 8B, the optical surface 2 of the lens 1 comprises the first optical surface 2a having a radius of curvature of $r_1$ and a second optical surface 2b which has a radius of curvature of $r_2$ and which opposes the first optical surface 2a. The lens I is a biconcave lens. As described above, the center mark 2c is provided at the center of the first optical surface 2a. The flange portion 3 comprises a first flange surface 3a which connects to the first optical surface 2a and which is a flat surface perpendicular to an optical axis 1ax, a second flange surface 3b which connects to the second optical surface 2b and which is a flat surface perpendicular to the optical axis 1ax, and a lens end surface 3c which is parallel to the optical axis 1ax.

Figure 9:
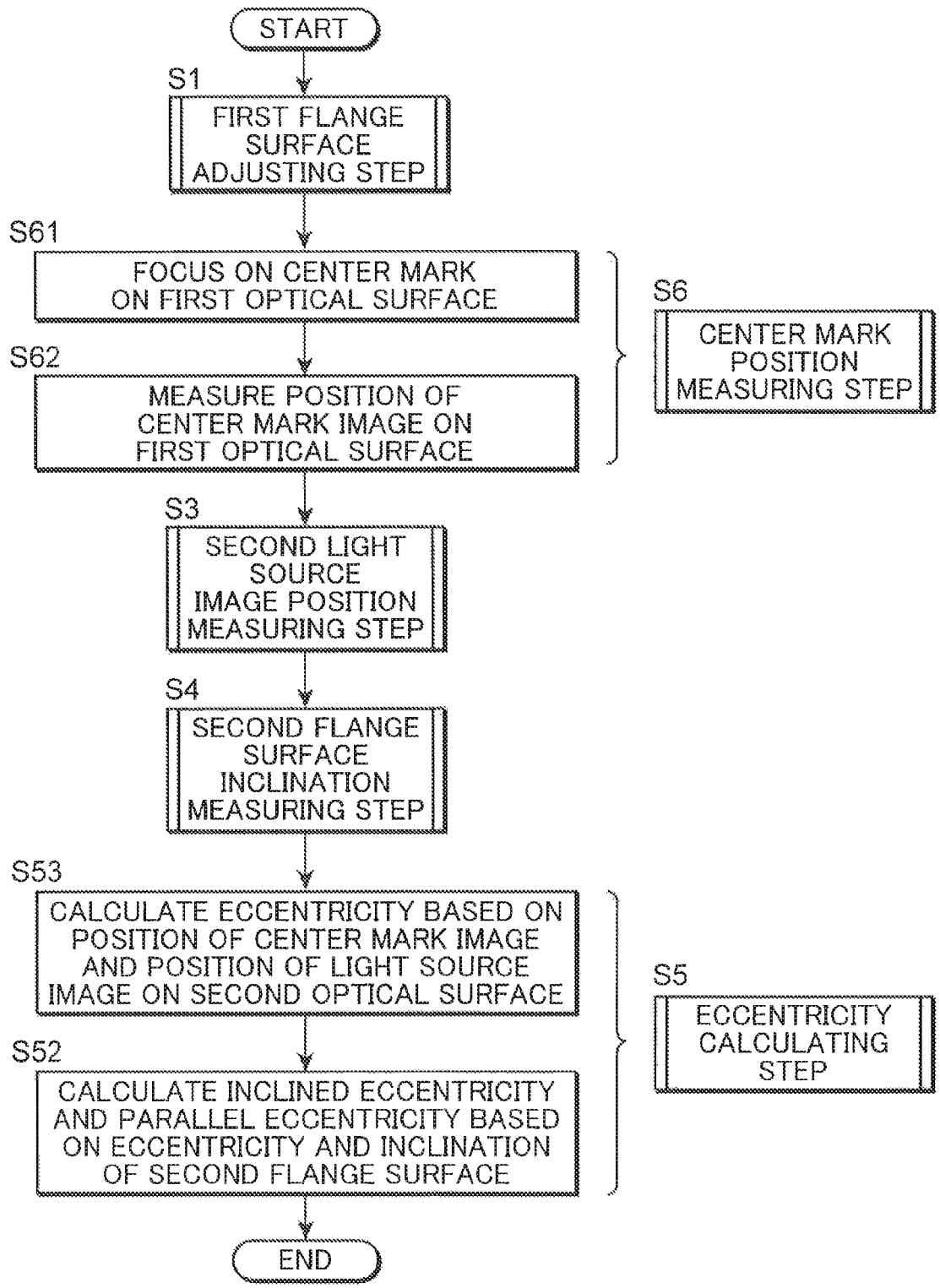
FIG. 9 is a process chart showing a second embodiment of an eccentricity measurement method.
Figure 10A:
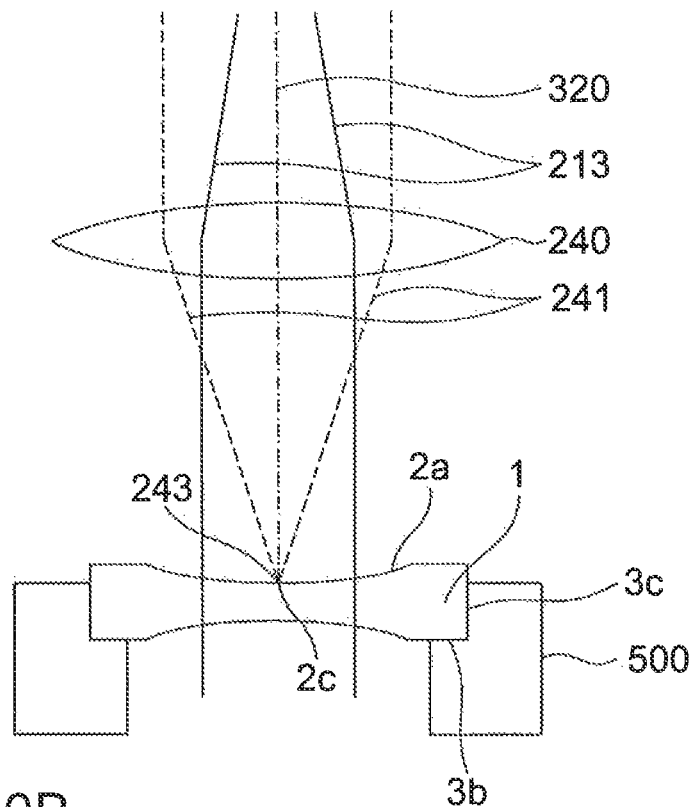
FIG. 10 is a schematic view showing the respective steps described in FIG. 9.
Figure 10B:
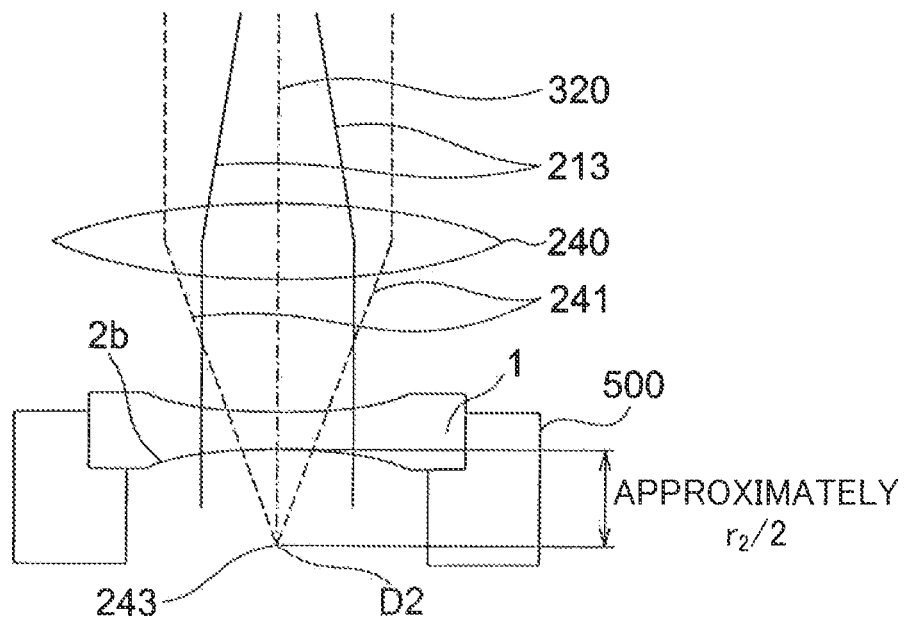
Figure 11:
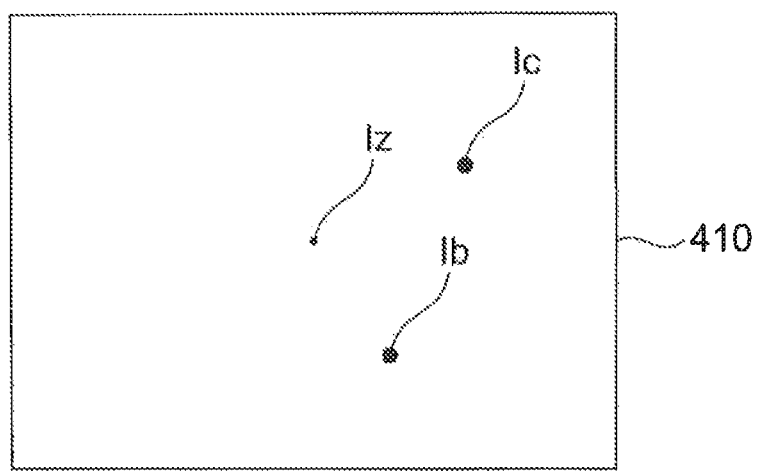
FIG. 11 is a schematic view showing an image on a measurement sensor during eccentricity measurement.

Next, a second embodiment of an eccentricity measuring method according to an embodiment of the present invention will be described with reference to FIGS. 9 to 11. FIG. 9 is a process chart showing the second embodiment of an eccentricity measurement method. FIG. 10 is a schematic view showing the respective steps described in FIG. 9. FIG. 11 is a schematic view showing an image on a measurement sensor during eccentricity measurement.

In FIG. 9, the second embodiment of an eccentricity measurement method comprises the five steps below.

(S1) First Flange Surface Adjusting Step

The first flange surface adjusting step is a step in which the first flange surface 3a is adjusted so as to be perpendicular to an optical axis 320 of an eccentricity measuring device 100. Since this step is the same as (S1) first flange surface adjusting step according to the first embodiment and shown in FIGS. 4 and 5A, a description thereof will be omitted.

(S6) Center Mark Position Measuring Step

The center mark position measuring step is a step in which a position of the center mark 2c provided on the first optical surface 2a is measured. In step S61 in FIG. 9, as shown in FIG. 10A, an interval between an objective lens 240 and the lens 1 is changed so that a focal point 243 of the objective lens 240 is brought into focus on the center mark 2c provided on the first optical surface 2a. Accordingly, an image of the center mark 2c is formed on an imaging plane 410 of a measurement sensor 400 via a measurement optical system 300.

In step S62 in FIG. 4, as shown in FIG. 11, a position Ic of an image of the center mark 2c formed on the imaging plane 410 of the measurement sensor 400 is measured and stored. Moreover, a point Iz shown in FIG. 11 represents a position of an optical axis 320.

(S3) Second Light Source Image Position Measuring Step

This second light source image position measuring step is a step in which a position of an image of the light source 210 reflected at the second optical surface 2b is measured. Since this step is the same as (S3) second light source image position measuring step according to the first embodiment and shown in FIGS. 4 and 6A, a description thereof will be omitted.

(S4) Second Flange Surface Inclination Measuring Step

This flange surface inclination measuring step is a step in which an inclination of the second flange surface 3b is measured. Since this step is similarly the same as (S4) second flange surface inclination measuring step according to the first embodiment and shown in FIGS. 4 and 6B, a description thereof will be omitted.

(S5) Eccentricity Calculating Step

This eccentricity calculating step is a step in which a relative eccentricity between the first optical surface 2a and the second optical surface 2b is calculated. In step S53 in FIG. 9, based on the position Ic of the image of the center mark 2c provided on the first optical surface 2a and measured in (S2) center mark position measuring step described above and on the second position Ib of the image of the light source 210 reflected at the second optical surface 2b and measured in (S3) second light source image position measuring step described above, a relative eccentricity between the first optical surface 2a and the second optical surface 2b is calculated. The eccentricity calculation method is the same as that of the first embodiment.

In step S52 in FIG. 9, using an inclination of the second flange surface 3b measured in (S4) second flange surface inclination measuring step or, in other words, using a relative inclined eccentricity between the first optical surface 2a and the second optical surface 2b, an inclined eccentricity of the second optical surface 2b is separated from the relative eccentricity between the first optical surface 2a and the second optical surface 2b and a relative parallel eccentricity between the first optical surface 2a and the second optical surface 2b is calculated by the same method as in the first embodiment.

Moreover, in the same manner as in the first embodiment, when there is no need to separate inclined eccentricity from parallel eccentricity, (S1) first flange surface adjusting step and (S4) second flange surface inclination measuring step are not essential.

As described above, according to the second embodiment, the eccentricity measuring method comprises: a first flange surface adjusting step of adjusting a first flange surface of an optical element so as to be perpendicular to an optical axis of an eccentricity measuring device; a center mark position measuring step of measuring a position of an image of a center mark provided on a first optical surface; a second light source image position measuring step of causing an illuminating light from a light source to be incident on a second optical surface and measuring a second position of an image of the illuminating light source formed by reflection of the illuminating light at the second optical surface; a second flange surface inclination measuring step of measuring an inclination of a second flange surface; and an eccentricity calculating step of calculating a relative eccentricity between the first optical surface and the second optical surface based on the position of the image of the center mark, the second position, and the inclination of the second flange surface. As a result, the present eccentricity measuring method is capable of measuring eccentricity with a same measurement optical system regardless of a radius of curvature of an optical surface of an optical element.

Next, an example of an optical element array will be described with reference to FIG. 12. FIG. 12 is a schematic view showing a shape of a lens array as an example of an optical element array, wherein FIG. 12A shows an external shape of the lens array, and FIG. 12B shows a section of the lens array taken along A-A' in FIG. 12A.

Figure 12A:
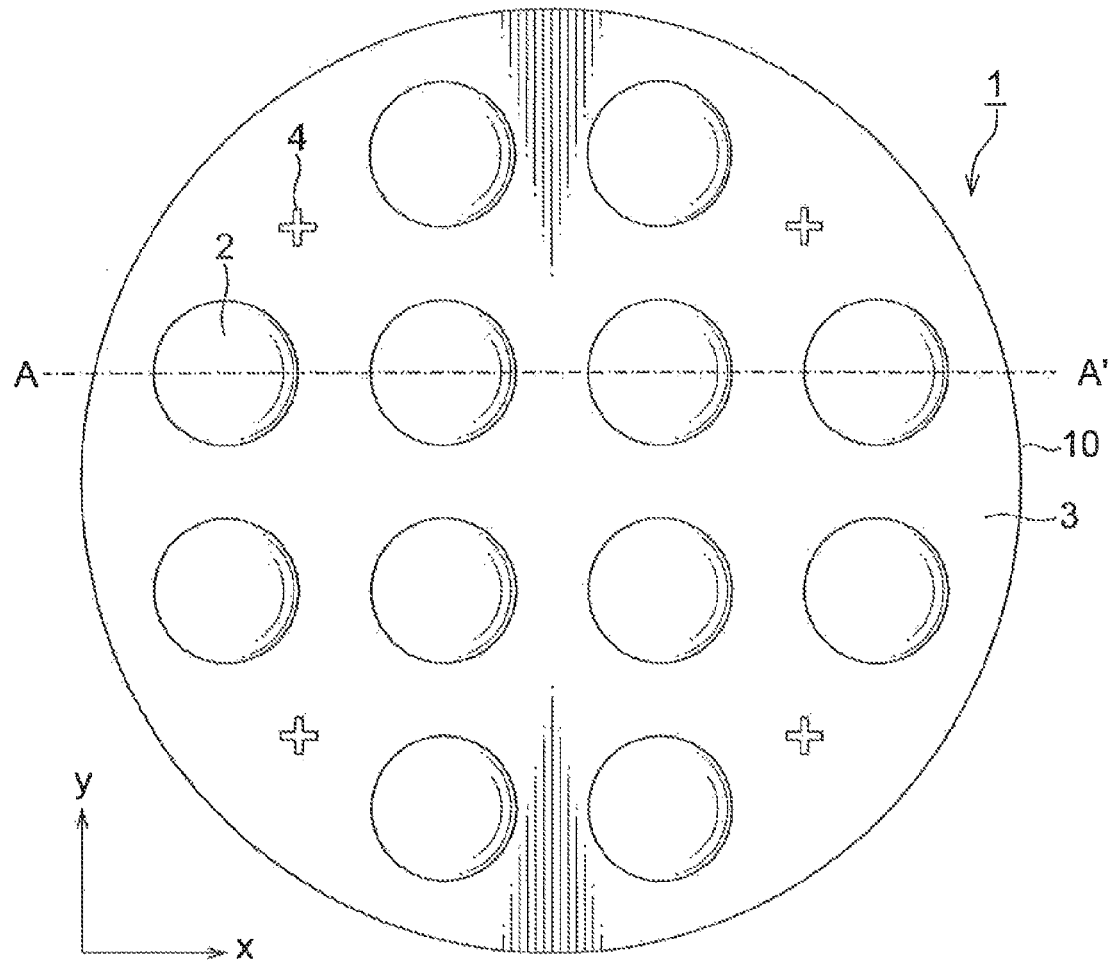
FIG. 12 is a schematic view showing a shape of a lens as a third example of an optical element.

In FIG. 12A, a lens array 10 is constituted by a plurality of lenses 1 which have an optical surface 2 and which are formed on a substrate 3. In addition, an alignment mark 4 used for positioning during manufacturing of the lens array 10 is also formed on the substrate 3. Here, in FIG. 12A, a left-right direction is assumed to be an x direction and a direction perpendicular to the x direction is assumed to be a y direction.

The lens array 10 is manufactured using a technique referred to as WLO (wafer level optics) in which several hundred to several thousand lenses 1 are formed on the substrate using semiconductor techniques and facilities. In addition to cast molding using a mold, WLO may be mass-produced using, for example, a photo mask, a photosensitive material, and an etching technique, In FIG. 12B, an optical surface 2 of the lens array 10 comprises a first optical surface 2a having a radius of curvature of $r_1$ and a second optical surface 2b which has a radius of curvature of $r_2$ and which opposes the first optical surface 2a. The substrate 3 comprises a first flange surface 3a which connects to the first optical surface 2a and which is a flat surface perpendicular to an optical axis 1ax and a second flange surface 3b which connects to the second optical surface 2b and which is a flat surface perpendicular to the optical axis 1ax. The alignment mark 4 described above is formed on the first flange surface 3a.

Figure 12B:
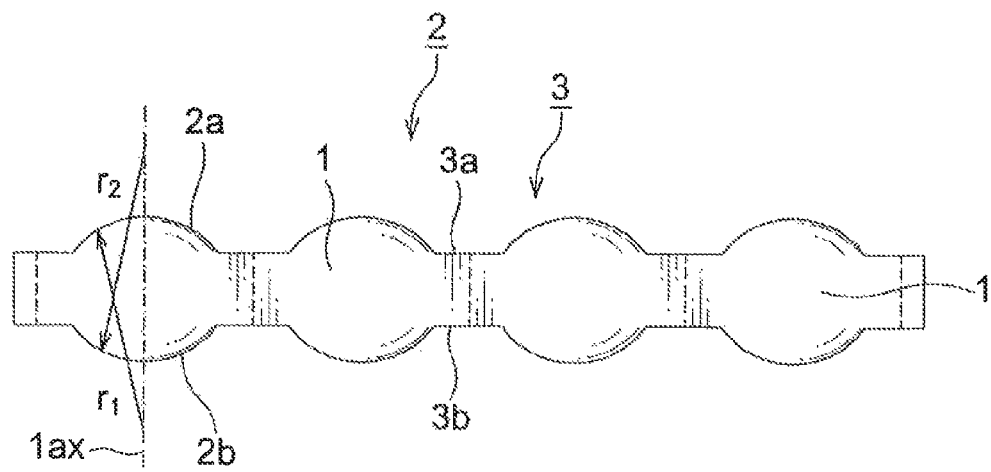

The lens array 10 is separated into individual lenses 1 by dicing or the like as indicated by the dashed lines in FIG. 12B. Alternatively, the lens array 10 may be used as a so-called fly's eye lens without being separated.

Figure 13:
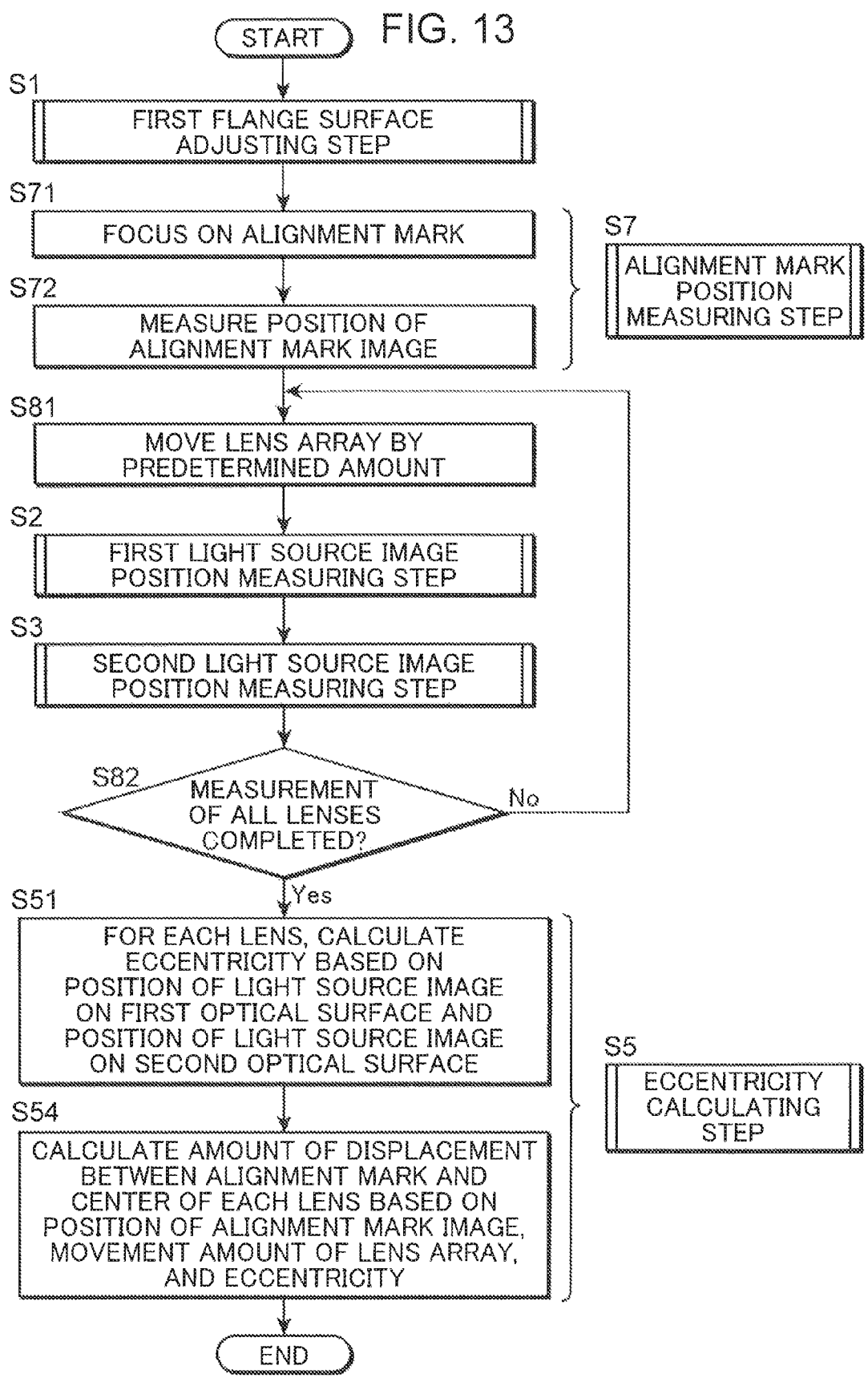
FIG. 13 is a process chart showing a third embodiment of an eccentricity measurement method.

Next, a third embodiment of an eccentricity measuring method according to an embodiment of the present invention will be described with reference to FIG. 13. FIG. 13 is a process chart showing the third embodiment of an eccentricity measurement method.

In FIG. 13, the third embodiment of an eccentricity measurement method comprises the five steps below.

(S1) First Flange Surface Adjusting Step

The first flange surface adjusting step is a step in which the first flange surface 3a is adjusted so as to be perpendicular to an optical axis 320 of an eccentricity measuring device 100. Since this step is the same as (S1) first flange surface adjusting step according to the first embodiment and shown in FIGS. 4 and 5A, a description thereof will be omitted.

(S7) Alignment Mark Position Measuring Step

The alignment mark position measuring step is a step in which a position of the alignment mark 4 provided on the first flange surface 3a is measured, In step S71 in FIG. 13, the lens array 10 is scanned within an x-y plane shown in FIG. 12 and, at the same time, a focal point 243 of an objective lens 240 is brought into focus on the alignment mark 4. In step S72, a position of an image of the alignment mark 4 formed on an imaging plane 410 of a measurement sensor 400 is measured and stored.

In step S81 in FIG. 13, the lens array 10 is moved by a predetermined amount within the x-y plane shown in FIG. 12. During a movement from the alignment mark 4, the predetermined amount is an amount of movement from the alignment mark 4 to a design center position of a lens 1 that is measured next, and during movement from a lens 1 to a next lens 1, the predetermined amount is an interval between the respective lenses 1 of the lens array 10.

(S2) First Light Source Image Position Measuring Step

This first light source image position measuring step is a step in which a position of an image of the light source 210 reflected at the first optical surface 2a is measured. Since this step is the same as (S2) first light source image position measuring step according to the first embodiment and shown in FIGS. 4 and 5B, a description thereof will be omitted.

(S3) Second Light Source Image Position Measuring Step

This second light source image position measuring step is a step in which a position of an image of the light source 210 reflected at the second optical surface 2b is measured. Since this step is the same as (S3) second light source image position measuring step according to the first embodiment and shown in FIGS. 4 and 6A, a description thereof will be omitted.

In step S82 in FIG. 13, a confirmation is made on whether or not measurements of (S2) first light source image position measuring step and (S3) second light source image position measuring step have been completed for all lenses I in the lens array 10, and the respective steps from step S81 described above to (S3) second light source image position measuring step are repeated until measurements of all the lenses are completed. Once measurements of all lenses have been completed (step S82: Yes), (S5) eccentricity calculating step is executed.

(S5) Eccentricity Calculating Step

This eccentricity calculating step is a step in which a relative eccentricity between the first optical surface 2a and the second optical surface 2b and an amount of displacement between the alignment mark 4 and a center of each lens 1 are calculated. In step S51 in FIG. 13, for each lens 1, based on the first position Ia of the image of the light source 210 reflected at the first optical surface 2a and measured in (S2) first light source image position measuring step described above and on the second position Ib of the image of the light source 210 reflected at the second optical surface 2b and measured in (S3) second light source image position measuring step described above, a relative eccentricity between the first optical surface 2a and the second optical surface 2b is calculated. The eccentricity calculation method is the same as that of the first embodiment.

In step S54 in FIG. 13, based on the position of an image of the alignment mark 4 measured in (S7) alignment mark position measuring step, the predetermined amount by which the lens array 10 had been moved in step S81, and the relative eccentricity between the first optical surface 2a and the second optical surface 2b calculated in step S51, an amount of displacement between the alignment mark 4 and the center of each lens 1 is calculated. Alternatively, an amount of relative displacement of the center of each lens 1 of the lens array 10 may be calculated.

As described above, according to the third embodiment, the eccentricity measuring method comprises: a first flange surface adjusting step of adjusting a first flange surface of an optical element array so as to be perpendicular to an optical axis of an eccentricity measuring device; an alignment mark position measuring step of measuring a position of an image of an alignment mark, and for each optical element of the optical element array: a first light source image position measuring step of causing an illuminating light from a light source to be incident on a first optical surface and measuring a first position of an image of the illuminating light source formed by reflection of the illuminating light at the first optical surface; a second light source image position measuring step of causing the illuminating light to be incident on a second optical surface and measuring a second position of an image of the illuminating light source formed by reflection of the illuminating light at the second optical surface; an eccentricity calculating step of calculating a relative eccentricity between the first optical surface and the second optical surface based on the first position and the second position; and a displacement amount calculating step of calculating an amount of displacement between the alignment mark and a center of each optical element. As a result, the eccentricity measuring method is capable of measuring eccentricity with a same measurement optical system regardless of a radius of curvature of an optical surface of an optical element.

Next, a third example of an optical element will be described with reference to FIG. 14. FIG. 14 is a schematic view showing a shape of a mirror as a third example of an optical element, wherein FIG. 14A shows an external shape of the mirror, and FIG. 14B shows a section of the mirror taken along A-A' in FIG. 14A.

Figure 14A:
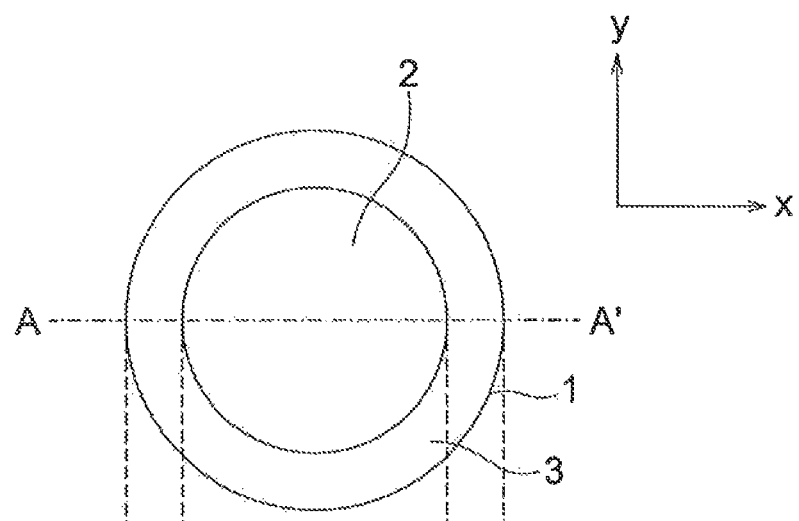
FIG. 14 is a schematic view showing a shape of a lens as a fourth example of an optical element.

In FIG. 14A, a mirror 1 is shaped such that a ring-like flange portion 3 encompasses an optical surface 2. In this example, the mirror 1 is formed by first performing molding by a method such as that shown in FIG. 16 and subsequently depositing Ag, Al, or the like on the optical surface 2. Here, in FIG. 14A, a left-right direction is assumed to be an x direction and a direction perpendicular to the x direction is assumed to be a y direction.

Figure 14B:
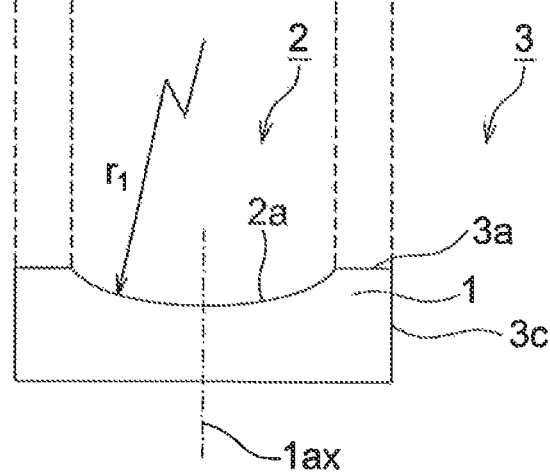

In FIG. 14B, the optical surface 2 of the mirror 1 is constituted by a first optical surface 2a with a radius of curvature of $r_1$. The flange portion 3 comprises a first flange surface 3a which connects to the first optical surface 2a and which is a flat surface perpendicular to an optical axis 1ax and an end surface 3c which is parallel to the optical axis 1ax.

Figure 15:
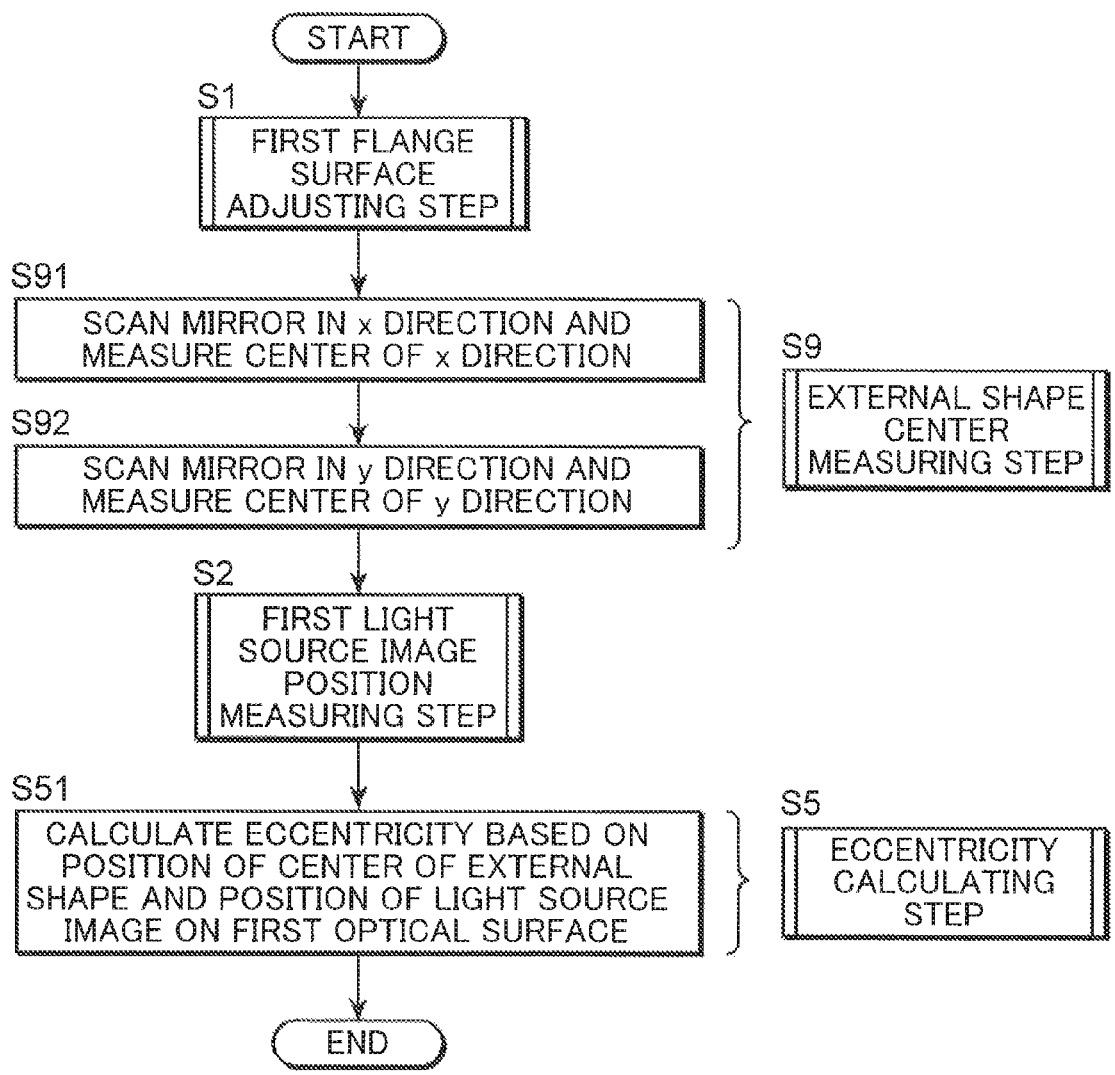
FIG. 15 is a process chart showing a fourth embodiment of an eccentricity measurement method.

Next, a fourth embodiment of an eccentricity measuring method according to an embodiment of the present invention will be described with reference to FIG. 15. FIG. 15 is a process chart showing the fourth embodiment of an eccentricity measurement method.

In FIG. 15, the fourth embodiment of an eccentricity measurement method comprises the four steps below.

(S1) First Flange Surface Adjusting Step

The first flange surface adjusting step is a step in which the first flange surface 3a is adjusted so as to be perpendicular to an optical axis 320 of an eccentricity measuring device 100, Since this step is the same as (S1) first flange surface adjusting step according to the first embodiment and shown in FIGS. 4 and 5A, a description thereof will be omitted.

(S9) External Shape Center Measuring Step

This external shape center measuring step is a step in which the mirror 1 is scanned in a direction perpendicular to the optical axis 320 and position of a center of an external shape of the mirror 1 is measured. In the fourth embodiment, the mirror 1 is held by a holding section 500 so as to be not only rotatable around the optical axis 320 and movable parallel to the optical axis 320, but also movable in at least two directions perpendicular to the optical axis 320.

In step S91 in FIG. 15, in a state where a focal point 243 of an objective lens 240 is brought into focus on a first flange surface 3a, the mirror 1 is scanned in an x direction shown in FIG. 14A and a center C(x) of an external shape of the mirror 1 in the x direction is measured from an image of the external shape of the mirror 1 as captured by a measurement sensor 300.

In a similar manner, in step S92 in FIG. 15, the mirror 1 is scanned in a y direction shown in FIG. 14A and a center C(y) of the external shape of the mirror 1 in the y direction is measured from an image of the external shape of the mirror 1 as captured by the measurement sensor 300. Subsequently, from C(x) and C(y) obtained in this manner, a center C(x,y) of the external shape of the mirror 1 is determined and stored.

(S2) First Light Source Image Position Measuring Step

This first light source image position measuring step is a step in which a position of an image of the light source 210 reflected at the first optical surface 2a is measured. Since this step is the same as (S2) first light source image position measuring step according to the first embodiment and shown in FIGS. 4 and 5B, a description thereof will be omitted.

(S5) Eccentricity Calculating Step

The eccentricity calculating step is a step in which an eccentricity between the center C(x,y) of the external shape of the mirror 1 and the first optical surface 2a is calculated. Based on the center C(x,y) of the external shape of the mirror 1 measured in (S7) external shape center measuring step described above and on the first position Ia of the image of the light source 210 reflected at the first optical surface 2a and measured in (S3) first light source image position measuring step, the eccentricity between the center C(x,y) of the external shape of the minor 1 and the first optical surface 2a is calculated using a distance between the position of the center C and the position Ia on the measurement sensor.

Moreover, when the optical element is not a mirror and comprises a first optical surface and a second optical surface as in the first and second optical element examples or the optical element array example described earlier, (S3) second light source image position measuring step and (S4) second flange surface inclination measuring step according to the first embodiment are performed between (S2) first light source image position measuring step and (S5) eccentricity calculating step described above.

As described above, according to the fourth embodiment, the eccentricity measuring method comprises: a first flange surface adjusting step of adjusting a first flange surface of an optical element so as to be perpendicular to an optical axis of an eccentricity measuring device; an external shape center measuring step of scanning the optical element in a direction perpendicular to the optical axis and measuring a position of a center of an external shape of the optical axis; a first light source image position measuring step of converting an illuminating light from a light source into a parallel light and causing the parallel illuminating light to he incident on a first optical surface, and measuring a first position of an image of the illuminating light source formed by reflection of the illuminating light at the first optical surface; and an eccentricity calculating step of calculating an eccentricity between the center of the external shape and the first optical surface based on the position of the center of the external shape and the first position. As a result, the present eccentricity measuring method is capable of measuring eccentricity with a same measurement optical system regardless of a radius of curvature of an optical surface of an optical element.

As described earlier, according to the present embodiment, the eccentricity measuring method is a method of measuring an eccentricity of an optical element having a first optical surface and a second optical surface which oppose each other, the eccentricity measuring method comprising: a first light source image position measuring step of converting an illuminating light from a light source into a parallel light and causing the parallel illuminating light to be incident on the first optical surface of the optical element, and measuring a first position of an image of the illuminating light source formed by reflection of the illuminating light at the first optical surface; a second light source image position measuring step of causing the illuminating light to he incident on the second optical surface and measuring a second position of an image of the illuminating light source formed by reflection of the illuminating light at the second optical surface; and an eccentricity calculating step of calculating a relative eccentricity between the first optical surface and the second optical surface based on the first position and the second position. Accordingly, the eccentricity measuring method enables measurement of eccentricity by a same measurement optical system regardless of a radius of curvature of an optical surface of an optical element.

In addition, the eccentricity measuring method according to the present embodiment is a method of measuring an eccentricity of an optical element having a first optical surface and a second optical surface which oppose each other, the eccentricity measuring method comprising: a center mark position measuring step of measuring a position of a center mark provided on the first optical surface of the optical element; a light source image position measuring step of converting an illuminating light from a light source into a parallel light and causing the parallel illuminating light to be incident on the second optical surface, and measuring a position of an image of the illuminating light source formed by reflection of the illuminating light at the second optical surface; and an eccentricity calculating step of calculating a relative eccentricity between the first optical surface and the second optical surface based on the position of the center mark and the position of the light source image. Accordingly, the eccentricity measuring method enables measurement of eccentricity by a same measurement optical system regardless of a radius of curvature of an optical surface of an optical element.

Furthermore, the eccentricity measuring method according to the present embodiment is a method of measuring an eccentricity of an optical element array configured such that a plurality of optical elements having a first optical surface and a second optical surface which oppose each other are coupled in a direction perpendicular to an optical axis, the eccentricity measuring method comprising: an alignment mark position measuring step of measuring a position of an alignment mark provided on the optical element array, and for each optical element constituting the optical element array: a first light source image position measuring step of converting an illuminating light from a light source into a parallel light and causing the parallel illuminating light to be incident on the first optical surface of the optical element, and measuring a first position of an image of the light source formed by reflection of the illuminating light at the first optical surface; a second light source image position measuring step of causing the illuminating light to be incident on the second optical surface and measuring a second position of an image of the light source formed by reflection of the illuminating light at the second optical surface; an eccentricity calculating step of calculating a relative eccentricity between the first optical surface and the second optical surface of each optical element based on the first position and the second position; and a displacement amount calculating step of calculating, for each of the optical elements, an amount of displacement between the alignment mark and a center of each optical element based on the position of the alignment mark and the eccentricity. Accordingly, the eccentricity measuring method enables measurement of eccentricity by a same measurement optical system regardless of a radius of curvature of an optical surface of an optical element.

Moreover, the eccentricity measuring method according to the present embodiment is a method of measuring an eccentricity of an optical element having at least a first optical surface, the eccentricity measuring method comprising: an external shape center measuring step of scanning the optical element in a direction perpendicular to an optical axis and measuring a position of a center of an external shape of the optical element; a light source image position measuring step of converting an illuminating light from a light source into a parallel light and causing the parallel illuminating light to be incident on the first optical surface, and measuring a position of an image of the illuminating light source formed by reflection of the illuminating light at the first optical surface; and an eccentricity calculating step of calculating an eccentricity of the first optical surface with respect to the external shape based on the position of the center of the external shape and the position of the light source image. Accordingly, the eccentricity measuring method enables measurement of eccentricity by a same measurement optical system regardless of a radius of curvature of an optical surface of an optical element.

In addition, in the eccentricity measuring method according to any of the embodiments described above, favorably, the optical element comprises a first flange section having at least a first flange surface, and the eccentricity measuring method comprises a first flange surface adjusting step of adjusting the first flange surface so as to be perpendicular to an optical axis of the illuminating light.

Furthermore, in the eccentricity measuring method described above, favorably, the optical element comprises a second flange portion having a second flange surface that opposes the first flange surface, the eccentricity measuring method further comprises a second flange surface inclination measuring step of measuring an inclination of the second flange surface with respect to the optical axis of the illuminating light, and the eccentricity calculating step is a step of obtaining a parallel eccentricity and an inclined eccentricity of the optical element based on the inclination of the second flange surface with respect to the optical axis of the illuminating tight, obtained in the second flange surface inclination measuring step.

Moreover, in the eccentricity measuring method according to any of the embodiments described above, favorably, a Kohler illumination for a microscope is used as the illuminating light.

The present application is based on and claims the benefit of Japanese Patent Application No. 2010-92057, filed Apr. 13, 2010, the content of which is hereby incorporated by reference in its entirety.

Although the present invention has been described above in an appropriate and sufficient manner in the form of embodiments with reference to the drawings, those skilled in the art will understand that various modifications and/or improvements may be readily made to the embodiments described above. Therefore, it is to be understood that all modifications and/or improvements implemented by those skilled in the art fall within the scope of the claims presented below unless such modifications and/or improvements depart from the scope of the claims.

INDUSTRIAL APPLICABILITY

According to the present invention, an eccentricity measuring method for measuring eccentricity can be provided.

The invention claimed is:

1. An eccentricity measuring method of an optical element having a first optical surface and a second optical surface which oppose each other,
    the eccentricity measuring method comprising:
    a first light source image position measuring step of converting an illuminating light from a light source into parallel light to be incident on the first optical surface and measuring a first position of an image of the light source formed by reflection of the illuminating light at the first optical surface;
    a second light source image position measuring step of causing the illuminating light to be incident on the second optical surface and measuring a second position of an image of the light source formed by reflection of the illuminating light at the second optical surface; and
    an eccentricity calculating step of calculating a relative eccentricity between the first optical surface and the second optical surface based on the first position and the second position.

2. An eccentricity measuring method of an optical element having a first optical surface and a second optical surface which oppose each other,
    the eccentricity measuring method comprising:
    a center mark position measuring step of measuring a position of a center mark provided on the first optical surface;
    a second light source image position measuring step of converting an illuminating light from a light source into parallel light to be incident on the second optical surface and measuring a position of an image of the light source formed by reflection of the illuminating light at the second optical surface; and
    an eccentricity calculating step of calculating a relative eccentricity between the first optical surface and the second optical surface based on the position of the center mark and the position of the light source image.

3. An eccentricity measuring method of an optical element array configured such that a plurality of optical elements having a first optical surface and a second optical surface which oppose each other are coupled in a direction perpendicular to an optical axis, the eccentricity measuring method comprising:
an alignment mark position measuring step of measuring a position of an alignment mark provided on the optical element array; and for each optical element constituting the optical element array:
a first light source image position measuring step of converting an illuminating light from a light source into parallel light to be incident on the first optical surface of the optical element and measuring a first position of an image of the light source formed by reflection of the illuminating light at the first optical surface;
a second light source image position measuring step of converting the illuminating light into parallel light to be incident on the second optical surface and measuring a second position of an image of the light source formed by reflection of the illuminating light at the second optical surface;
an eccentricity calculating step of calculating, for each of the optical elements, a relative eccentricity between the first optical surface and the second optical surface based on the first position and the second position; and
a displacement amount calculating step of calculating, for each of the optical elements, an amount of displacement between the alignment mark and a center of each of the optical elements based on the position of the alignment mark and the eccentricity.

4. An eccentricity measuring method of an optical element having at least a first optical surface, the eccentricity measuring method comprising:
an external shape center measuring step of scanning the optical element in a direction perpendicular to an optical axis and measuring a position of a center of an external shape of the optical element;
a first light source image position measuring step of converting an illuminating light from a light source into parallel light to be incident on the first optical surface and measuring a first position of an image of the light source formed by reflection of the illuminating light at the first optical surface; and
an eccentricity calculating step of calculating an eccentricity of the first optical surface with respect to the external shape based on the position of the center of the external shape and the first position.

5. The eccentricity measuring method according to claim 1, wherein
the optical element comprises a first flange section having at least a first flange surface, and
the eccentricity measuring method comprises a first flange surface adjusting step of adjusting the first flange surface so as to be perpendicular to the optical axis of the illuminating light.

6. The eccentricity measuring method according to claim 5, wherein
the optical element comprises a second flange portion having a second flange surface that opposes the first flange surface,
the eccentricity measuring method further comprises a second flange surface inclination measuring step of measuring an inclination of the second flange surface with respect to the optical axis of the illuminating light, and
the eccentricity calculating step is a step of obtaining a parallel eccentricity and an inclined eccentricity of the optical element based on the inclination of the second flange surface with respect to the optical axis of the illuminating light, obtained in the second flange surface inclination measuring step.

7. The eccentricity measuring method according to claim 2, wherein the optical element comprises a first flange section having at least a first flange surface, and
the eccentricity measuring method comprises a first flange surface adjusting step of adjusting the first flange surface so as to be perpendicular to the optical axis of the illuminating light.

8. The eccentricity measuring method according to claim 7, wherein the optical element comprises a second flange portion having a second flange surface that opposes the first flange surface,
the eccentricity measuring method further comprises a second flange surface inclination measuring step of measuring an inclination of the second flange surface with respect to the optical axis of the illuminating light, and
the eccentricity calculating step is a step of obtaining a parallel eccentricity and an inclined eccentricity of the optical element based on the inclination of the second flange surface with respect to the optical axis of the illuminating light, obtained in the second flange surface inclination measuring step.

9. The eccentricity measuring method according to claim 3, wherein
the optical element comprises a first flange section having at least a first flange surface, and
the eccentricity measuring method comprises a first flange surface adjusting step of adjusting the first flange surface so as to be perpendicular to the optical axis of the illuminating light.

10. The eccentricity measuring method according to claim 9, wherein the optical element comprises a second flange portion having a second flange surface that opposes the first flange surface,
the eccentricity measuring method further comprises a second flange surface inclination measuring step of measuring an inclination of the second flange surface with respect to the optical axis of the illuminating light, and
the eccentricity calculating step is a step of obtaining a parallel eccentricity and an inclined eccentricity of the optical element based on the inclination of the second flange surface with respect to the optical axis of the illuminating light, obtained in the second flange surface inclination measuring step.

11. The eccentricity measuring method according to claim 4, wherein the optical element comprises a first flange section having a least a first flange surface, and
the eccentricity measuring method comprises a first flange surface adjusting step of adjusting the first flange surface so as to be perpendicular to the optical axis of the illuminating light.

12. The eccentricity measuring method according to claim 11, wherein the optical element comprises a second flange portion having a second flange surface that opposes the first flange surface,
the eccentricity measuring method further comprises a second flange surface inclination measuring step of measuring an inclination of the second flange surface with respect to the optical axis of the illuminating light, and
the eccentricity calculating step is a step of obtaining a parallel eccentricity and an inclined eccentricity of the optical element based on the inclination of the second flange surface with respect to the optical axis of the illuminating light, obtained in the second flange surface inclination measuring step.

* * * * *